(12) United States Patent
Chung et al.

(10) Patent No.: US 12,408,585 B2
(45) Date of Patent: *Sep. 9, 2025

(54) FORCE AMPLIFIED FASTENER FOR POWER TOOL IMPLEMENTS

(71) Applicant: TECHTRONIC CORDLESS GP, Anderson, SC (US)

(72) Inventors: Koon For Chung, Kwai Chung (CN); Tsz Kin Wong, Kwai Chung (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/287,777

(22) PCT Filed: Apr. 23, 2021

(86) PCT No.: PCT/CN2021/089276
§ 371 (c)(1),
(2) Date: Oct. 20, 2023

(87) PCT Pub. No.: WO2022/222135
PCT Pub. Date: Oct. 27, 2022

(65) Prior Publication Data
US 2024/0191777 A1 Jun. 13, 2024

(51) Int. Cl.
*F16H 13/06* (2006.01)
*A01D 34/416* (2006.01)
(Continued)

(52) U.S. Cl.
CPC ....... *A01D 34/733* (2013.01); *A01D 34/4165* (2013.01); *F16H 1/32* (2013.01);
(Continued)

(58) Field of Classification Search
CPC .............. A01D 34/733; A01D 34/4165; A01D 34/416; F16H 1/32; F16H 1/321; F16H 13/06; F16H 2001/323; F16H 2035/005
See application file for complete search history.

(56) References Cited

U.S. PATENT DOCUMENTS 4,585,025 A 4/1986 Hendrick
5,934,853 A 8/1999 Junkers
(Continued)

FOREIGN PATENT DOCUMENTS

CN 2733067 Y 10/2005
CN 201456225 U 5/2010
(Continued)

OTHER PUBLICATIONS

International Search Report Corresponding with Chinese Application No. PCT/CN2021/089276 dated Oct. 15, 2021.

*Primary Examiner* — Justin Holmes
(74) *Attorney, Agent, or Firm* — Dority & Manning, P.A.

(57) ABSTRACT

Systems and methods which provide force amplified fastener assemblies configured for use with respect to detachable implements for power tools are described. Force amplified fastener assemblies may implement various gear train configurations for giving a mechanical advantage with respect to manual manipulation of the fastener assembly. A force amplified fastener assembly may include a lock mechanism operative to lock and/or unlock the force amplified fastener assembly and thus a fastening element thereof. Force amplified fastener assemblies of embodiments of the inventions may be utilized in place of conventional lock nut for affixing detachable implements to power tools.

24 Claims, 19 Drawing Sheets

(51) Int. Cl.
*A01D 34/73* (2006.01)
*F16H 1/32* (2006.01)
*F16H 35/00* (2006.01)

(52) U.S. Cl.
CPC ............ *A01D 34/416* (2013.01); *F16H 1/321* (2013.01); *F16H 2001/323* (2013.01); *F16H 13/06* (2013.01); *F16H 2035/005* (2013.01)

(56) References Cited

U.S. PATENT DOCUMENTS

| | | | |
|---|---|---|---|
| 6,682,284 | B2 | 1/2004 | Chen |
| 6,913,429 | B1 | 7/2005 | Phillips |
| 7,124,566 | B2 | 10/2006 | Treger |
| 7,179,035 | B2 | 2/2007 | Axelsson |
| 8,016,532 | B2 | 9/2011 | Park |
| 8,220,365 | B2 | 7/2012 | Yang |
| 8,225,698 | B2 | 7/2012 | Yang |
| 8,225,699 | B2 | 7/2012 | Yang |
| 8,702,363 | B2 | 4/2014 | Lee |
| 8,746,100 | B2 | 6/2014 | Cook |
| 8,899,894 | B2 | 12/2014 | Limpert |
| 9,267,587 | B2 | 2/2016 | Abevi |
| 9,568,076 | B2 | 2/2017 | McGrath |
| 9,631,663 | B2 | 4/2017 | Carnevali |
| 9,936,635 | B2 | 4/2018 | Gottinger |
| 10,041,573 | B2 | 8/2018 | Abevi |
| D828,153 | S | 9/2018 | Sato |
| 10,265,837 | B2 * | 4/2019 | Lin .................. B25B 17/02 |
| 2015/0354667 | A1 * | 12/2015 | Tesar ................. H02K 7/116 475/180 |
| 2019/0003517 | A1 | 1/2019 | Hess |
| 2019/0285141 | A1 * | 9/2019 | Ohr .................... B60K 17/145 |
| 2019/0299373 | A1 | 10/2019 | Usui |
| 2019/0353198 | A1 | 11/2019 | Moarefi |
| 2020/0124081 | A1 | 4/2020 | Bengtsson et al. |
| 2020/0291984 | A1 | 9/2020 | Wang |
| 2020/0393030 | A1 | 12/2020 | Guan |
| 2024/0188490 | A1 * | 6/2024 | Chung ............... A01D 34/4165 |

FOREIGN PATENT DOCUMENTS

| | | |
|---|---|---|
| CN | 202742328 U | 2/2013 |
| CN | 104265749 B | 3/2016 |
| CN | 105805100 B | 7/2016 |
| CN | 205715196 U | 11/2016 |
| CN | 303985034 S | 12/2016 |
| CN | 106763603 B | 5/2017 |
| CN | 106979212 A | 7/2017 |
| CN | 107642536 A | 1/2018 |
| CN | 206883155 U | 1/2018 |
| CN | 107926325 A | 4/2018 |
| CN | 207315836 U | 5/2018 |
| CN | 108331829 B | 7/2018 |
| CN | 207754151 U | 8/2018 |
| CN | 108679076 B | 10/2018 |
| CN | 207927298 U | 10/2018 |
| CN | 108825636 A | 11/2018 |
| CN | 108953354 A | 12/2018 |
| CN | 109168571 A | 1/2019 |
| CN | 109372877 A | 2/2019 |
| CN | 106640913 B | 3/2019 |
| CN | 109773470 A | 5/2019 |
| CN | 209115511 U | 7/2019 |
| CN | 110185691 A | 8/2019 |
| CN | 209268092 U | 8/2019 |
| CN | 110206809 A | 9/2019 |
| CN | 110355712 A | 10/2019 |
| CN | 209539931 U | 10/2019 |
| CN | 110397657 A | 11/2019 |
| CN | 209628155 U | 11/2019 |
| CN | 110578743 A | 12/2019 |
| CN | 209774484 U | 12/2019 |
| CN | 209954711 U | 1/2020 |
| CN | 110788790 A | 2/2020 |
| CN | 110792678 A | 2/2020 |
| CN | 111034455 A | 4/2020 |
| CN | 210290450 U | 4/2020 |
| CN | 210318115 U | 4/2020 |
| CN | 210328614 U | 4/2020 |
| CN | 210371535 U | 4/2020 |
| CN | 111271364 A | 6/2020 |
| CN | 108757695 B | 7/2020 |
| CN | 111396436 A | 7/2020 |
| CN | 111457070 A | 7/2020 |
| CN | 210920040 U | 7/2020 |
| CN | 211163727 U | 8/2020 |
| CN | 211185047 U | 8/2020 |
| CN | 111649055 A | 9/2020 |
| CN | 211693411 U | 10/2020 |
| CN | 211761131 U | 10/2020 |
| CN | 112013001 A | 12/2020 |
| CN | 112141368 A | 12/2020 |
| CN | 212278872 U | 1/2021 |
| CN | 112497156 A | 3/2021 |
| CN | 110657152 A | 8/2021 |
| CN | 112425346 A | 11/2021 |
| CN | 111878512 A | 6/2022 |
| DE | 20208806 U1 | 8/2002 |
| DE | 20302843 U1 | 4/2003 |
| DE | 102016117487 A1 | 3/2018 |
| DE | 102019202035 A1 | 8/2020 |
| EP | 0764789 A1 | 3/1997 |
| EP | 2014933 B1 | 12/2010 |
| EP | 2404495 B1 | 1/2012 |
| EP | 2784350 B1 | 10/2014 |
| EP | 2798937 A1 | 11/2014 |
| EP | 2798937 B1 | 2/2016 |
| EP | 3636097 A1 | 4/2020 |
| FR | 2854213 A1 | 10/2004 |
| FR | 3098268 A1 | 1/2021 |
| GB | 2498829 B | 7/2013 |
| WO | WO-8805386 A1 * | 7/1980 |
| WO | WO 81/00337 A1 | 2/1981 |
| WO | WO9910662 A1 | 3/1999 |
| WO | WO2018097592 A1 | 5/2018 |
| WO | WO2019190116 A1 | 10/2019 |
| WO | WO2020121865 A1 | 6/2020 |
| WO | WO2020131972 A1 | 6/2020 |
| WO | WO2020158700 A1 | 8/2020 |
| WO | WO2020213774 A1 | 10/2020 |
| WO | WO2020213828 A1 | 10/2020 |

* cited by examiner

FORCE AMPLIFIED FASTENER FOR POWER TOOL IMPLEMENTS

This application is a National Stage Patent Application of PCT/CN2021/089276, filed on Apr. 23, 2021, the disclosure of which is incorporated by reference herein in its entirety.

TECHNICAL FIELD

The present invention relates generally to garden machines having detachable implements and, more particularly, to fasteners useful with respect to detachable implements for power tools.

BACKGROUND OF THE INVENTION

Various configurations of power tools are commonly used in performing routine tasks in daily life. For example, power tools in the form of garden machines, such as lawn mowers, brush cutters, string trimmers, grass edgers, etc., are used every day by persons performing work and leisure related tasks. These power tools often comprise a motor of some form (e.g., electric motor or internal combustion motor) outputting power via a shaft which drives an implement configured for the related task. As examples, a lawn mower may drive an implement in the form of a grass cutting blade, a brush cutter may drive an implement in the form of a multipurpose cutting blade, a string trimmer may drive an implement in the form of string spool head, and a grass edger may drive an implement in the form of an edging blade.

An implement may be configured to be detachable from a host power tool. For example, detachable implements may be utilized to accommodate selection of an implement configuration for a particular task (e.g., selectively installing a grass cutting blade configured for mulching or clipping collection, etc.) and/or to facilitate replacing or repairing a damaged implement (e.g., removal and reinstalling a grass cutting blade after sharpening its previously dulled edges or replacing a dull grass cutting blade with a sharp grass cutting blade, etc.).

Typically, one or more tools are required for changing (e.g., removing and/or installing) a detachable implement. For example, a hand tool in the form of a wrench (e.g., open-end wrench, socket wrench, or adjustable wrench) in the appropriate size for engaging a fastener (e.g., locking nut assembly, such as a reusable nut and lock washer, single use nyloc nut, etc.) affixing the implement to a shaft assembly (e.g., spindle) of the power tool is needed for changing a detachable implement. Additionally, a hand tool in the form of a brace or second wrench is often needed to prevent movement of the shaft and implement when tightening or loosening the fastener affixing the implement to a shaft assembly of the power tool for changing the detachable implement. As an alternative to a second hand tool, some implementations have used a pin which may be manually pushed inside an aligned hole in order to lock the spindle of the power tool. As another alternative to a second hand tool, such as may be implemented with respect to a power tool that does not provide for reverse rotation operation, a shaft bearing of the power tool may be replaced by a one-way bearing that serves as spindle lock.

In many situations, the fastener affixing the implement to the power tool is seated with appreciable torque (e.g., intentionally, such as to prevent unwanted relative displacement of the implement due to driving forces and/or impacts during use, or unintentionally, such as resulting from inertial tightening in association with application of driving forces). Accordingly, a wrench used for changing a detachable implement must be of sufficient length and durability to accommodate facilitate application of significant forces on a nut fastening the implement on the garden machine, such as when unfastening the implement.

It is often difficult or impractical to store hand tools appropriate for changing a detachable implement on or with the power tool. For example, even where the size and bulk of such hand tools may be provided some form of storage space on a power tool, the often rugged use, presence of appreciable vibrations, etc. can cause the hand tools to migrate from their storage space and be lost. Further, power tools having detachable implements are often operated in areas away from repair facilities or places in which it is convenient or customary to store tools appropriate to changing detachable implements. For example, a lawn mower, string trimmer, or grass edger may be operated in a home environment in which the owner has a very limited selection of tools, and thus appropriately sized hand tools for changing a detachable implement may not be available to the operator. In another example, a lawn mower or brush cutter may be operated in a field or other large parcel of land relatively far from a supply of tools and, although a replacement cutting blade may be carried by the operator, sufficient tools for changing the cutting blade may not be available.

Manipulation of a fastener by hand (e.g., without aid of separate tools) to remove and replace a detachable implement is often not possible due to the forces required. For example, as described above, the fastener may have been seated with appreciable torque whereby a typical user may not be able to apply sufficient counter torque (e.g., on the order of 12 Nm) to facilitate loosening the fastener. Similarly, a typical user may be unable to apply sufficient torque to a fastener by hand to seat the fastener sufficiently to prevent unwanted relative displacement of the implement during use due to driving forces.

Various special configurations of detachable implements have been proposed to prevent unwanted relative displacement of the implement during use even in situations where a fastener is applied by hand without significant torque. For example, the blade carrier of EP 2 798 937 B1 (the disclosure of which is incorporated herein by reference) includes two pins which protrude into corresponding openings in the blade for providing a rotationally fixed connection with the blade. Such specially configured detachable implements generally do not provide a backward compatible solution. Moreover, the lack of sufficient torque when the fastening device is applied by hand to attach the specially configured blade to the lawn mower may not result in a frictional interface between the fastening device and the blade to prevent the fastening device from rotating in a releasing direction and disengaging from the lawn mower. Accordingly, a latch for the fastening device is proposed by EP 2 798 937 B1. The proposed latch provides for manually operated latching elements, wherein two levers are pivotably mounted on the blade carrier and are used to release the fastening device. The configuration of the latching elements and levers on the blade carrier is such that these components are exposed to objects encountered by the lawn mower and/or objects propelled by impacting the rotating blade. For example, the design of the fastening device exposes the components to dirt build up on surfaces and clearances of moving parts creating large friction between relative movement of the parts, such as may lead to larger actuating force needed and even loss of intended function. The design of the fastening device likewise exposes the components to various objects (e.g., rocks, gravel, sticks from trees, etc.) which may strike components of the fastening device with considerable force. Accordingly, the latch may be subject to damage and even functional failure, such as may result in the latch no longer being capable of manipulation by hand and/or the latch being unintentionally released allowing the fastening device to become detached from the lawn mower.

Special configurations of quick-connect detachable implements have also been attempted. However, such detachable implements and/or their quick-connect apparatus suffer from a number of drawbacks. For example, quick-connect detachable implements often utilize a special arbor or shape design for torque transmission instead of frictional flange and nut design commonly used, and thus do not provide a backward compatible solution. Moreover, many power tools, such as lawn mowers and brush trimmers, have high demands with respect to a detachable implement (e.g., blades) withstanding shock forces from striking other objects, which often cannot be met by quick-connect detachable implement solutions.

It can be appreciated from the foregoing that existing solutions often are inadequate to facilitate convenient changing of detachable implements utilized with respect to various power tools. For example, it is often inconvenient and sometimes even impossible to change a detachable implement despite the implement having been configured for detachment and reattachment. Even where it is possible to change a detachable implement, it is often inconvenient to do so (e.g., separate tools must be kept up with, force sufficient to cause pain or discomfort to a user's hand must be applied, etc.).

BRIEF SUMMARY OF THE INVENTION

The present invention is directed to systems and methods which provide force amplified fastener assemblies configured for use with respect to detachable implements for power tools. Force amplified fastener assemblies of embodiments of the invention may implement a gear train configured for giving a mechanical advantage with respect to manual manipulation (e.g., grasping by hand to manually apply tightening or loosening torque) of the fastener assembly. Various force amplifying gear train configurations may, for example, be utilized with respect to a force amplified fastener assembly according to concepts of the present invention to provide a requisite mechanical advantage.

In accordance with embodiments of the invention, a force amplified fastener assembly may comprise planetary gearing disposed within a hand graspable housing to give mechanical advantage with respect to manual fastener tightening and/or loosening forces. Additionally or alternatively, a force amplified fastener assembly of embodiments may comprise cycloidal gearing disposed within a hand graspable housing to give mechanical advantage with respect to manual fastener tightening and/or loosening forces.

Force amplified fastener assemblies of embodiments of the invention may be utilized in place of a conventional lock nut for affixing detachable implements to power tools. For example, force amplified fastener assemblies of embodiments may be used for fixing a blade assembly to a host garden machine (e.g., a lawn mower, a brush cutter, a grass edger, etc.). It should be appreciated, however, that force amplified fastener assemblies provided according to concepts herein may be utilized in a variety of applications and with various host power tool configurations, such as with garden machines which do not have blade implements (e.g., string trimmers) and/or other forms of power tools (e.g., carpentry saws). Irrespective of the particular power tool configuration with which a force amplified fastener assembly is used, the force amplified fastener assembly of embodiments facilitates a user manually, by bare hand, applying force for loosening (e.g., releasing direction) and/or tightening (e.g., fastening direction) the fastener (e.g., for changing a detachable implement). For example, when used in a lawnmower, a force amplified fastener assembly may be operated directly by hand (e.g., tool-free) to achieve cutting blade installation, removal, replacement, and/or the like. Accordingly, a force amplified fastener assembly of embodiments of the invention may provide a tool-free implement change mechanism, whereby changing (e.g., installation, removal, replacement, etc.) of detachable implements with respect to a host power tool is facilitated without aid of separate tools.

Force amplified fastener assemblies of embodiments of the invention may include a lock mechanism operative to lock and/or unlock the force amplified fastener assembly and thus a fastening element thereof. In operation according to embodiments, the fastening element (e.g., a nut or other threaded fastening device) can be rotated in a fastening direction by the force amplified fastener assembly so as to fix, mount, tighten, etc. a blade or other detachable implement onto a motor shaft, wherein this rotation is reversible. That is, the fastening element can be rotated in a releasing direction opposite to the fastening direction so as to loosen, release, etc. the blade or other detachable implement from the motor shaft. A lock mechanism of embodiments may lock the force amplified fastener assembly so that the fastening assembly is not released unwantedly or unintentionally.

A lock mechanism of embodiments of a force amplified fastener assembly may rely upon user action to unlock and/or lock the lock mechanism. For example, a user may squeeze one or more members of a lock mechanism to unlock operation of the locking mechanism for rotation of a force amplified fastener in a releasing direction, otherwise the force amplified fastener assembly may be rotated only in the fastening direction. Additionally or alternatively, a lock mechanism of embodiments may be locked and/or unlocked in response to one or more forces other than from user unlocking/locking action. For example, a lock mechanism of some embodiments may be locked and/or unlocked by centrifugal force (e.g., locked to prevent rotation in the releasing direction while the detachable implement is spinning) or by the force of gravity when the power tool is disposed in a particular orientation (e.g., unlocked when a head of the power tool upon which a detachable implement is fastened is turned upside down for user service). In accordance with some examples, rotation of the detachable implement and corresponding force amplified fastener assembly at a certain speed provides sufficient centrifugal force to encourage pawls of a lock mechanism in the force amplified fastener assembly to engage and lock the fastening element (e.g., nut) to discourage rotation of the force amplified fastener assembly and the fastening element therein in the releasing direction. In accordance with this example, when the power tool is stopped, a bias spring may pull the locking pawl into a disengaged position so user can rotate the force amplified fastener assembly and the fastening element therein in the fastening and/or releasing direction. In accordance with another example, when the force amplified fastener assembly faces to the ground (e.g., the host power tool is in a use orientation), a lock pawl of a lock mechanism thereof is engaged by gravity, whereas when the force amplified fastener assembly faces upward (e.g., the host power tool is in a service orientation) the locking pawl of the lock mechanism is released.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
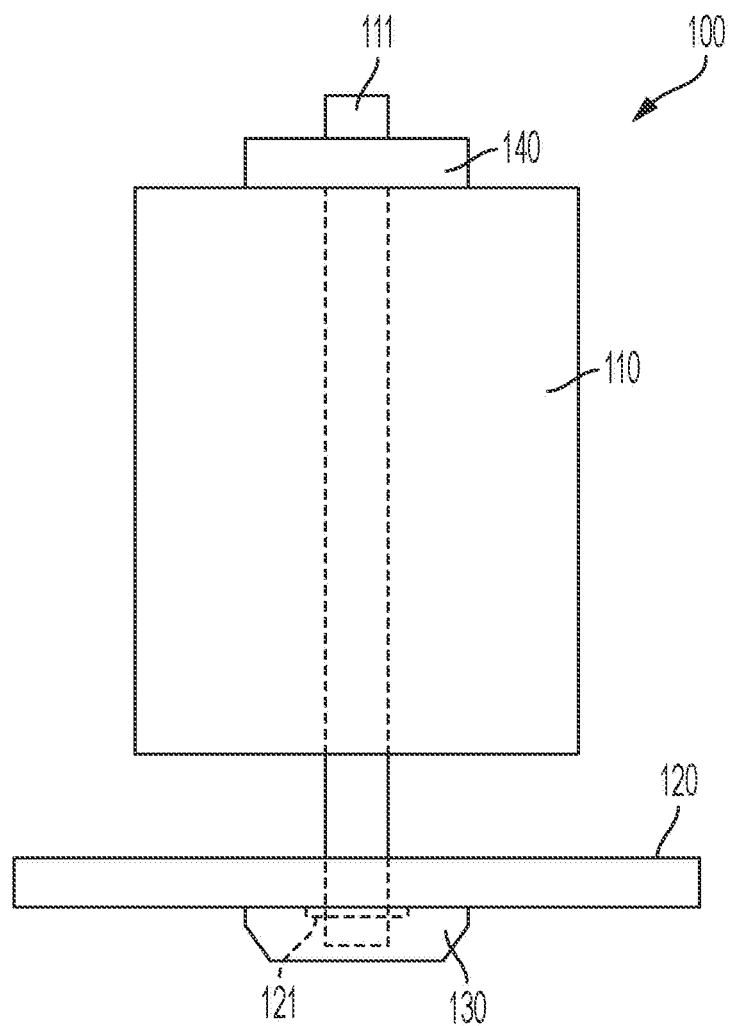
FIG. 1 shows a portion of a power tool for which a force amplified fastener assembly is provided according to embodiments of the present invention.

FIG. 1 shows a portion of a power tool configured to utilized detachable implements, wherein a force amplified fastener assembly of embodiments of the present invention is provided to facilitate changing (e.g., installation, removal, replacement, and/or the like) of the detachable implements. Power tool 100 may comprise various configurations of motorized tools configured for performing one or more tasks using corresponding configurations of detachable implement 120. By way of example, power tool 100 of some embodiments may comprise a garden machine in the form of a lawn mower or brush cutter and detachable implement 120 may comprise a cutting blade (e.g., low lift/side-discharge blade, mulching blade, dethatching blade, brush blade, etc.). In accordance with other embodiments, power tool 100 and detachable implement 120 may comprise configurations of a string trimmer and string spool head, leaf blower, cultivator, hedge trimmer blade, and/or brush cutter attachments, a grass edger and edging blade, a carpentry saw and crosscut blade, ripsaw blade, and/or dado blade, etc.

In the example of FIG. 1, power tool 100 comprises motor assembly 110 driving detachable implement 120. Motor assembly 110 of embodiments may comprise various motor configurations. For example, motor assembly 110 of some embodiments may comprise an electric motor, such as a direct current (DC) motor (e.g., brushed motor, brushless motor, etc.) or alternating current (AC) motor (e.g., induction motor, synchronous motor, etc.), powered by batteries, main lines, solar collector, generator, etc. In accordance with some embodiments, motor assembly 110 may comprise an internal combustion motor, such as a gasoline engine or diesel engine, powered by a combustible fuel source.

As shown in the example of FIG. 1, a shaft assembly of motor assembly 110 is utilized to drive detachable implement 120 in operation of power tool 100. Accordingly, in the example of FIG. 1, detachable implement 120 is coupled to a first end of shaft 111 shown passing through the main body of motor assembly 110. It should be appreciated that, although not shown in FIG. 1, the shaft assembly may comprise structure in addition to shaft 111. For example, a shaft assembly of motor assembly 110 may include a mounting or backer plate affixed to shaft 111 for interfacing with detachable implement 120. For example, a mounting or backer plate may be provided to serve as a means by which relative axial motion between the detachable implement and shaft assembly may be prevented or discouraged (e.g., a mounting or backer plate may be configured to provide a clamp-fit interface providing a friction interface using clamping force and/or a form-fit interface providing an interference interface using structures that receive or project into the implement to prevent the relative axial motion). As another example, shaft assembly of motor assembly 110 may include drive gearing and/or a transmission (e.g., providing speed and/or direction control, increased/decreased rotational speed and/or torque, etc.). Accordingly, although the example shown in FIG. 1 shows motor assembly 110 directly driving detachable implement 120, a gear train may be utilized between an output shaft of motor assembly 110 and detachable implement 120 according to embodiments. Irrespective of the particular structure of the shaft assembly of motor assembly 110, detachable implement 120 is removably coupled (e.g., directly or indirectly) to shaft 111 for receiving power from motor assembly 110 in operation of power tool 100.

Force amplified fastener assembly 130 of embodiments of the invention is shown in the example of power tool 100 fastening detachable implement 120 to shaft 111 of motor assembly 110. Force amplified fastener assembly 130 may, for example, be utilized in place of a conventional lock nut (e.g., retrofitting a conventional lock nut in some cases or as an original fastener means in other cases) for affixing detachable implement 120 to power tool 100. In accordance with embodiments of the invention, force amplified fastener assembly 130 facilitates a user manually (e.g., by bare hand) applying force for loosening (e.g., releasing direction) and/or tightening (e.g., fastening direction) force amplified fastener assembly 130 for changing detachable implement 120.

By way of a concrete example for aiding in understanding concepts of the present invention, force amplified fastener assembly 130 of FIG. 1 may be used to replace a blade for a brush cutter or mower (e.g., brush cutter or mower configuration of power tool 100 implementing a blade configuration of detachable implement 120). Manual actuation of force amplified fastener assembly 130 can loosen the fastener assembly and allow for its removal from shaft 111, thereby loosening the blade and facilitating its removal from the brush cutter or mower. When a new blade is to be affixed onto the motor shaft, actuation of force amplified fastener assembly 130 may tighten the fastener assembly on shaft 111 to thereby affixing the blade on the brush cutter or mower.

Force amplified fastener assembly 130 of embodiments of the invention implements a force amplifying gear train configured for giving a mechanical advantage with respect to manual manipulation of the fastener assembly. In operation of a force amplifying gear train of force amplified fastener assembly 130, a force applied by a user (e.g., torque applied in a fastening direction and/or torque applied in a releasing direction) to force amplified fastener assembly 130 (e.g., by grasping a housing of the fastener assembly by hand to manually apply tightening or loosening torque) is increased with respect to its transmission to a fastening element of the fastener assembly. As such, a user may be enabled to apply appreciably more force with respect to rotation of fastening element than would otherwise be possible by the user directly engaging the fastening element.

Various force amplifying gear train configurations may be utilized with respect to force amplified fastener assembly 130 of embodiments to provide a requisite mechanical advantage. According to some embodiments of the invention, force amplified fastener assembly 130 may comprise planetary gearing disposed within a hand graspable housing to give mechanical advantage with respect to manual fastener tightening and/or loosening forces. Additionally or alternatively, force amplified fastener assembly 130 of embodiments may comprise cycloidal gearing disposed within a hand graspable housing to give mechanical advantage with respect to manual fastener tightening and/or loosening forces. The mechanical advantage provided by such force amplifying gear train configurations of embodiments may, for example, provide force amplification on the order of 3-15 times between a manual force applied to a housing of the fastener assembly and a corresponding force applied with respect to a fastening element of the fastener assembly. The force applied to the fastening element as increased by force amplified fastener assembly 130 of embodiments is thus sufficient to overcome static forces of a fastener element seated with appreciable torque (e.g., intentionally, such as to prevent unwanted relative displacement of the detachable implement due to driving forces and/or impacts during use, or unintentionally, such as resulting from inertial tightening in association with application of driving forces). Moreover, force amplifying gear train configurations of embodiments of the invention facilitate implementations of reliable lock mechanisms.

In accordance with embodiments of the invention, force amplified fastener assembly 130 may be manually engaged by a user to fasten and/or unfasten detachable implement 120 from power tool 100 without aid of separate tools. Accordingly, force amplified fastener assembly 130 of embodiments may provide a tool-free implement change configuration.

Embodiments of power tool 100 may be configured for facilitating changing of detachable implement 120 using force amplified fastener assembly 130 without aid of separate tools. For example, power tool 100 may include motor shaft locking apparatus 140 operative cooperatively with force amplified fastener assembly 130 to facilitate changing of detachable implement 120 with respect to power tool 100. In accordance with some examples, motor shaft locking apparatus 140 may be engaged without aid of separate tools to prevent movement of shaft 111 when affixing detachable implement 120 to shaft 111 and/or removing detachable implement 120 from shaft 111. For example, motor shaft locking apparatus 140 may comprise a pin which may be pushed inside an aligned hole in order to lock shaft 111 of power tool 100. According to another example, motor shaft locking apparatus 140 may comprise a one-way bearing that serves as reverse rotational lock with respect to shaft 111. In accordance with yet another example, motor shaft locking apparatus 140 may comprise a locker collar configuration in which a locking collar includes a wide slot section and a narrow slot section configured for selectively allowing and discouraging rotation of shaft 111. For example, in operation of a locker collar of some examples, when shaft 111 is within the wide slot section, shaft 111 and the locking collar do not interface and shaft 111 is free to rotate. However, when the locker collar is slid laterally with respect to shaft 111, shaft 111 is disposed within the narrow slot section such that shaft 111 and the locking collar interface to discourage shaft 111 from rotating (e.g., a portion of shaft 111 disposed in juxtaposition with the locking collar may be provided with a square cross-section configured to cooperate with the narrow slot section of locking collar to interface and discourage rotation of shaft 111 when motor shaft locking apparatus 140 is engaged).

Irrespective of the particular configuration of motor shaft locking apparatus 140, motor shaft locking apparatus 140 may be operable in cooperation with force amplified fastener 130 to facilitate affixing detachable implement 120 to or removing detachable implement 120 from the motor shaft assembly of power tool 100 without the use of additional tools according to some embodiments of the invention. For example, an operator of power tool 100 may install and/or remove detachable implement 120 by engaging motor shaft locking apparatus 140 (e.g., through manual manipulation or automatic engagement) and loosening or tightening force amplified fastener assembly 130 through manual manipulation.

It should be appreciated that embodiments of force amplified fastener assembly 130 herein may be utilized with or without further configuration of power tool 100 for facilitating changing of detachable implement 120. For example, some embodiments of force amplified fastener assembly 130 may be utilized without cooperation of a motor shaft locking apparatus (e.g., an implementation of power tool 100 not having motor shaft locking apparatus 140). In one example, a user may manually prevent detachable implement 120 from rotating (e.g., grasping a unsharpened portion, such as a handle portion, of a blade configuration of detachable implement 120 with one hand) while manually manipulating force amplified fastener assembly 130 in a fastening direction or releasing direction with another hand.

FIGS. 2A-2E and 3A-3E show details with respect to various embodiments of force amplified fastener assembly 130. In particular, FIGS. 2A-2E show details with respect to an embodiment of force amplified fastener assembly 130 implementing a planetary gear configuration for giving a mechanical advantage with respect to manual manipulation of the fastener assembly. Similarly, FIGS. 3A-3E show details with respect to an embodiment of force amplified fastener assembly 130 implementing a cycloid gear configuration for giving a mechanical advantage with respect to manual manipulation of the fastener assembly. Although planetary gear and cycloid gear configurations are shown in the illustrated examples, it should be appreciated that other forms of gear trains (e.g., double reduction gear configurations, reverted gear configurations, etc.) may be utilized in addition to or in the alternative to a planetary gear configuration and/or a cycloid gear configuration. Moreover, multiple types of gearing (e.g., a gear train configuration including a combination of planetary gearing and cycloid gearing) may be utilized in a gear train of some embodiments of force amplified fastener assembly 130.

Figure 2A:
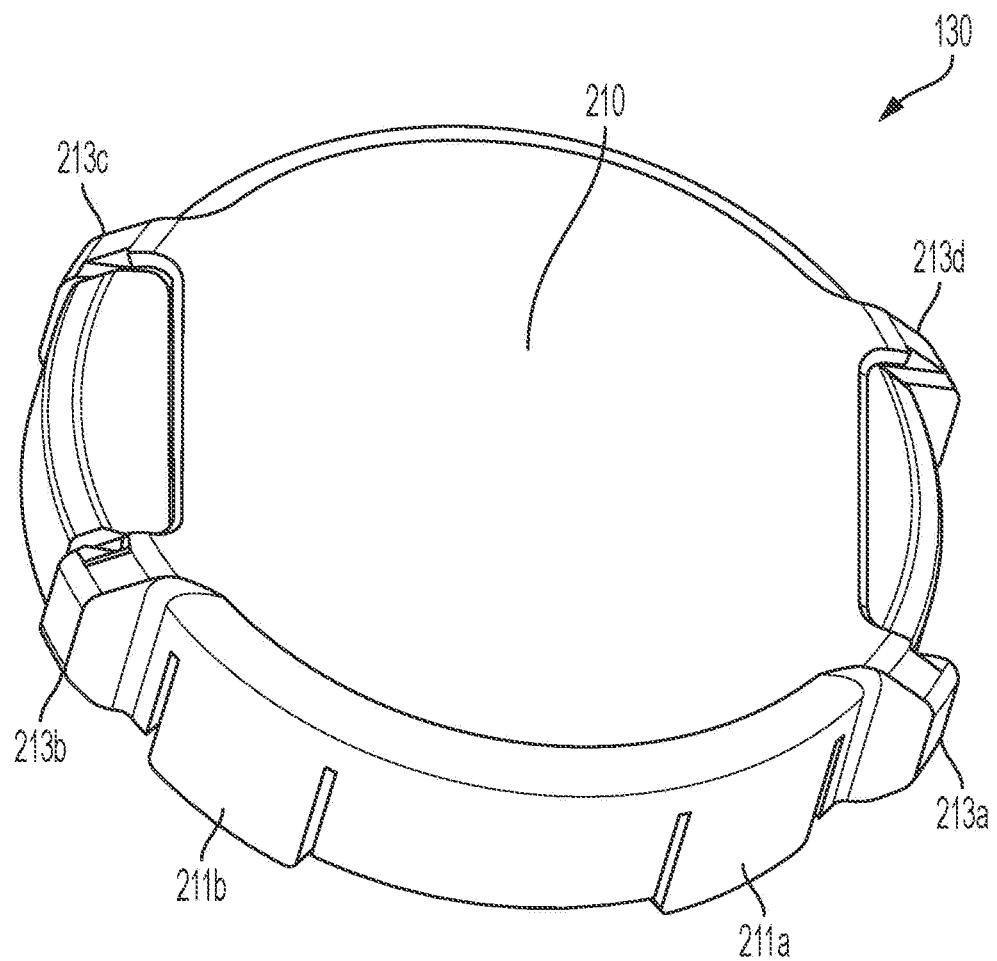
FIGS. 2A-2E show various views of a force amplified fastener assembly implementing an exemplary planetary gear train according to embodiments of the present invention.
Figure 2B:
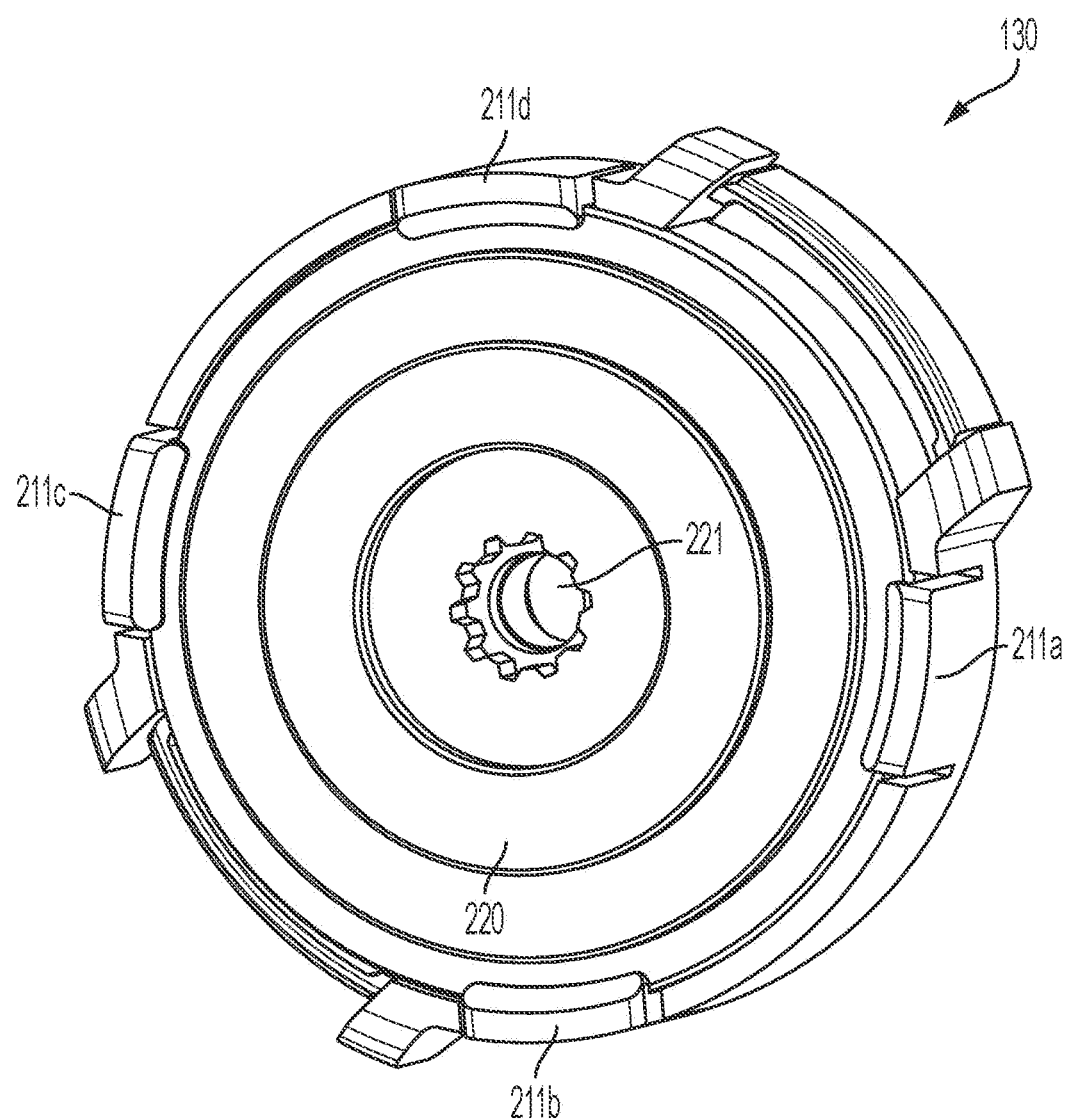

Reference is first made to the exemplary embodiment of FIGS. 2A-2E in which a planetary gear configuration is implemented. FIGS. 2A and 2B show a planetary gear configuration of an embodiment of force amplified fastener assembly 130 in its assembled state. As shown in the top isometric view of FIG. 2A, the illustrated planetary gear configuration comprises top housing 210. Correspondingly, as shown in the bottom isometric view of FIG. 2B, the illustrated planetary gear configuration comprises bottom structure 220. It should be appreciated that, although the views, housings, and structures are referred to as top and bottom, the designations are relative and there is no limitation that the example force amplified fastener assembly be disposed or utilized in any particular orientation with respect to top and bottom. For example, when utilized with respect to a lawn mower implementation of power tool 100, top housing 210 may be oriented as facing down when installed on shaft 111 and affixing detachable implement 120 in the form of a grass cutting blade to power tool 100.

Top housing 210 and bottom structure 220 are configured for cooperatively incarcerating a planetary gear train and fastening element of the example force amplified fastener assembly. For example, as may be seen in the partially exploded views of FIGS. 2C and 2D, bottom structure 220 may form a cupped structure sized and shaped to nest within a cupped casing formed by top housing 210. In accordance with some examples, the top edge circumference of bottom structure 220 may, when fully nested with top housing 210, terminate at or very near the bottom facing surface of top housing 210, such as for incarcerating components of the planetary gear train and for providing a substantially enclosed area in which infiltration of debris and/or other matter is discouraged. The nested relationship of top housing 210 and bottom structure 220 of embodiments, however, allows for relative rotational movement between the top housing and bottom structure (e.g., top housing 210 may be rotated while bottom structure 220 nested therein is held stationary).

In accordance with the exemplary embodiment, locking tabs 211a-211d of top housing 210 may facilitate bottom structure 220 being slid into a cavity of the cupped casing formed by top housing 210, whereby once bottom structure 220 is fully nested with top housing 210 the locking tabs retain the top housing and bottom structure in the nested relationship. For example, bottom structure 220 of the illustrated embodiment substantially encloses the gap between the bottom edge circumference of top housing 210 and the bottom edge circumference of bottom structure 220, such as to facilitate locking tabs 211a-211d of top housing 210 engaging bottom structure 220 for facilitate retaining the top housing and bottom structure in the nested relationship. Additionally or alternatively such a relationship with respect to the bottom edge circumference of top housing 210 and the bottom edge circumference of bottom structure 220 may be configured to prevent infiltration of debris and/or other matter into the area enclosed by the top housing and bottom structure.

Top housing 210 of embodiments may be configured to facilitate manual manipulation by a user. For example, top housing 210 may be sized and shaped to facilitate grasping by hand so that a user may manually apply torque forces (e.g., torque in fastening and/or releasing directions) to force amplified fastener assembly 130. Additionally or alternatively, top housing 210 may comprise surface features (e.g., rib structure, surface perturbations, rubberized over-molding, etc.) for facilitating gripping and application of force. The illustrated embodiment of top housing 210, for example, includes rib structures 213a-213d disposed about the circumference of the top housing, such as may be utilized to enable and/or enhance a user's grip upon force amplified fastener assembly 130.

Bottom structure 220 of the illustrated embodiment is configured to accept insertion of drive member of a power tool, such as shaft 111 of power tool 100, for facilitating interfacing the drive member with a fastening element of force amplified fastener assembly 130. For example, shaft orifice 221 of the illustrated embodiment of bottom structure 220 may be sized and shaped to accommodate insertion of an end of shaft 111 there through. According to some examples, shaft orifice 221 may be shaped or otherwise be configured (e.g., comprising the undulated circumference of the illustrated embodiment, a square circumference, a hexagonal circumference, etc.) for interfacing with one or more components external to force amplifying fastener assembly 130 (e.g., stay 121 of FIG. 1, as may be disposed upon shaft 111), such as for discouraging or preventing relative rotary movement (e.g., for avoiding unintended unfastening the fastening element as a result of inertial force when the power tool stops or is braked).

Figure 2C:
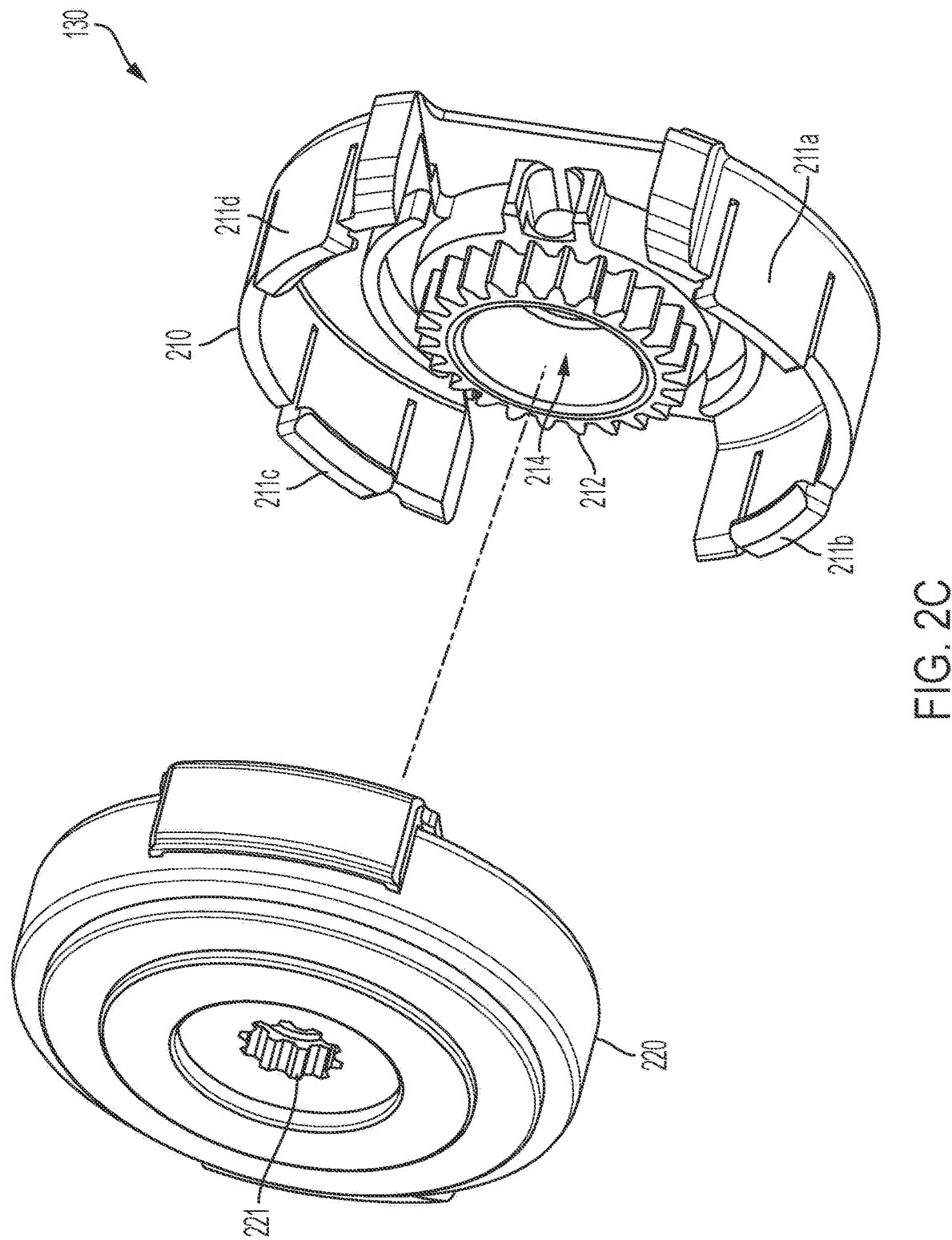
Figure 2D:
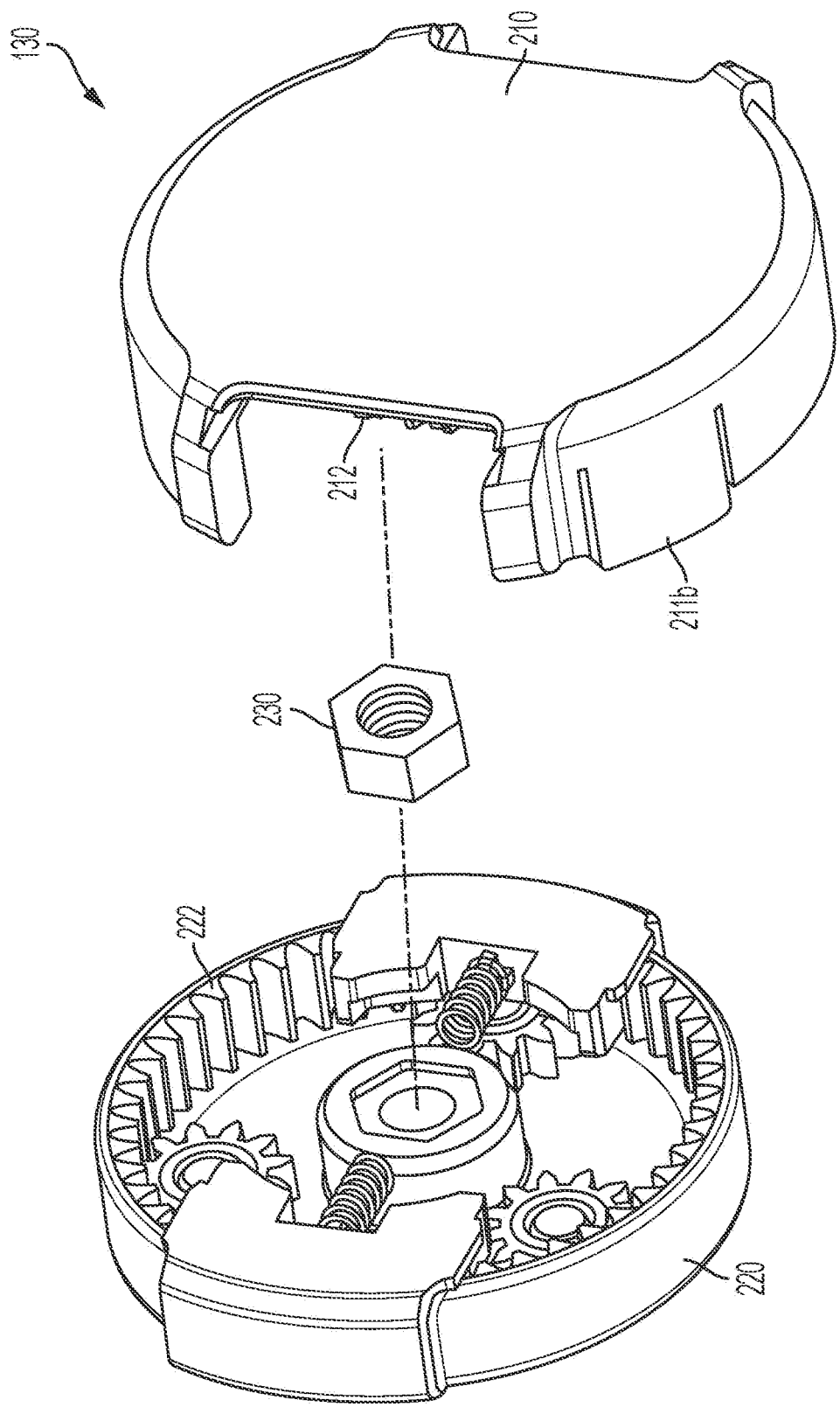
Figure 2E:
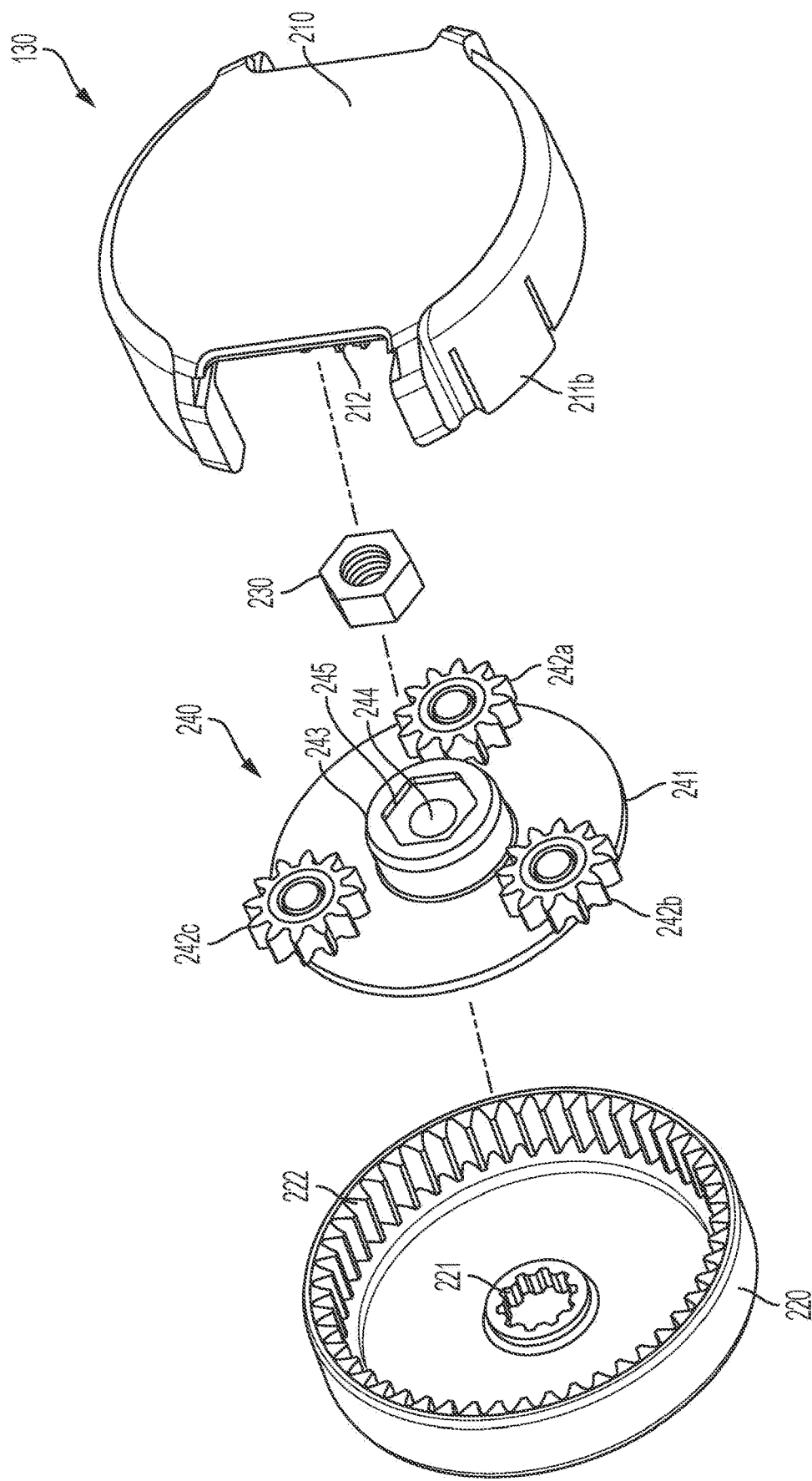

Force amplified fastener assembly 130 of the embodiment of FIGS. 2A-2E implements a planetary gear train configured for giving a mechanical advantage with respect to applying tightening or loosening torque to fastening element 230 in response to manual manipulation (e.g., grasping by hand to manually apply torque in a fastening direction or releasing direction) of the fastener assembly. Accordingly, as shown in FIG. 2C, top housing 210 of the example embodiment includes sun gear 212 of the planetary gear train in the illustrated planetary gear configuration of force amplified fastener assembly 130. As shown in FIG. 2D, bottom structure 220 includes ring gear 222 of the exemplary planetary gear train. Planet gear assembly 240, visible in the further exploded view of FIG. 2E (having some components of the exemplary embodiment of force amplified fastener assembly 130 omitted), comprises planet gears 242a-242c which interface between sun gear 212 and ring gear 222 to provide a planetary gearing implementation. In particular, planet gear assembly 240 of the illustrated embodiment is received within a cavity of the cupped structure formed by bottom structure 220, whereby once bottom structure 220 is fully nested with top housing 210 planet gears 242a-242c are incarcerated within an interior area of the top housing and bottom structure and provide a geared interface between sun gear 212 and ring gear 222.

In accordance with embodiments, sun gear 212 is affixed to or formed as part of top housing 210 and ring gear 222 is affixed to or formed as part of bottom structure 220. Accordingly, when top housing 210 is rotated (e.g., in response to a user manually applying a torque force thereto), sun gear 212 of embodiments will correspondingly be rotated. Similarly, ring gear 222 rotates or does not rotate in correspondence with bottom structure 220. The incarcerated relationship of planet gear assembly 240 within the interior area of bottom structure 220 nested within top housing 210 allows for relative rotational movement of gear plate 241 with respect to the top housing and bottom structure. For example, top housing 210 may be rotated with bottom structure 220 nested therein held stationary and gear plate 241 may rotate at a different speed than top housing 210. That is, rotation of top housing 210 and thus sun gear 212 meshed with planet gears 242a-242c causes the planet gears to rotate oppositely, whereby planet gears 242a-242c meshed with ring gear 222 held stationary by bottom structure 220 results in gear plate 241 rotating in the direction of top housing 210/sun gear 212, albeit at a reduced rotational rate and having a higher torque force.

Planet gear assembly 240 includes fastening element housing 243 configured for accepting fastening element 230 in coaxial correspondence with shaft orifice 221. Accordingly, fastening element housing 243 of the illustrated embodiment includes shaft orifice 244 sized and shaped to accommodate insertion of an end of shaft 111 there through, whereby a fastening element disposed within receiver cavity 245 of fastening element housing 243 may interface with shaft 111. The illustrated embodiment of fastening element housing 243 is sized and shaped to extend into and nest within an inner circumference of sun gear 212 when planet gear assembly 240 is incarcerated within the nested top housing and bottom structure. Accordingly, fastening element 230 disposed in receiver cavity 245 may be captured in a space between fastening element housing 243 and top housing 210 of embodiments of the invention.

Fastening element housing 243 may be affixed to or formed as part of gear plate 241 of the illustrated embodiment. Accordingly, when gear plate 241 rotates, fastening element housing 243 of embodiments will correspondingly be rotated. Receiver cavity 245 of embodiments is configured to encourage fastening element 230 to rotate in correspondence with gear plate 241. Fastening element 230 of embodiments may comprise a nut or other threaded fastening device configured to be rotated in a fastening direction and a releasing direction upon a power member. For example, the illustrated embodiment of fastening element 230 comprises a nut appropriately threaded to engage an end of shaft 111 of power tool 100, such as may be utilized to fix, mount, tighten, etc. detachable implement 120 onto shaft 111. Accordingly, receiver cavity 245 of fastening element housing 243 of the illustrated embodiment is shaped to receive fastening element 230 and to provide control of movement thereof relative to shaft 111. For example, the illustrated embodiment of receiver cavity 245 comprises a hexagon circumference corresponding to the shape of the example nut implementation of fastening element 230.

Although fastening element 230 of the example illustrated in FIGS. 2A-2E is described as disposed in receiver cavity 245 of fastening element housing 243 on gear plate 241, it should be appreciated that other configurations of fastening elements may be utilized according to embodiments of the invention. For example, rather than a separate component (e.g., nut) providing fastening element 230, some embodiments of fastening element 230 may be formed integral to another component of force amplified fastener assembly 130. As a specific example, fastening element 230 may be formed as suitably threaded portion of shaft orifice 244 sized and shaped to correspond to the size and shape of the end of shaft 111.

In operation of force amplified fastener assembly 130 of the embodiment of FIGS. 2A-2E, when shaft 111 is inserted through orifices 221 and 244 and interfaces with fastener element 230, top housing 210 may be grasped by the hand of a user and rotated in a fastening direction or a releasing direction to correspondingly rotate fastener element 230 relative to shaft 111. Sun gear 212, planet gears 242a-242c, and ring gear 222 of the planetary gear train provide a mechanical advantage with respect to applying tightening or loosening torque to fastening element 230. That is, a mechanical advantage corresponding to the size relationship between sun gear 212 and planet gears 242a-242c (e.g., on the order of 3-5 times) may be implemented between the torque manually applied to top housing 210 and the resultant torque applied to fastener element 230.

Figure 3A:
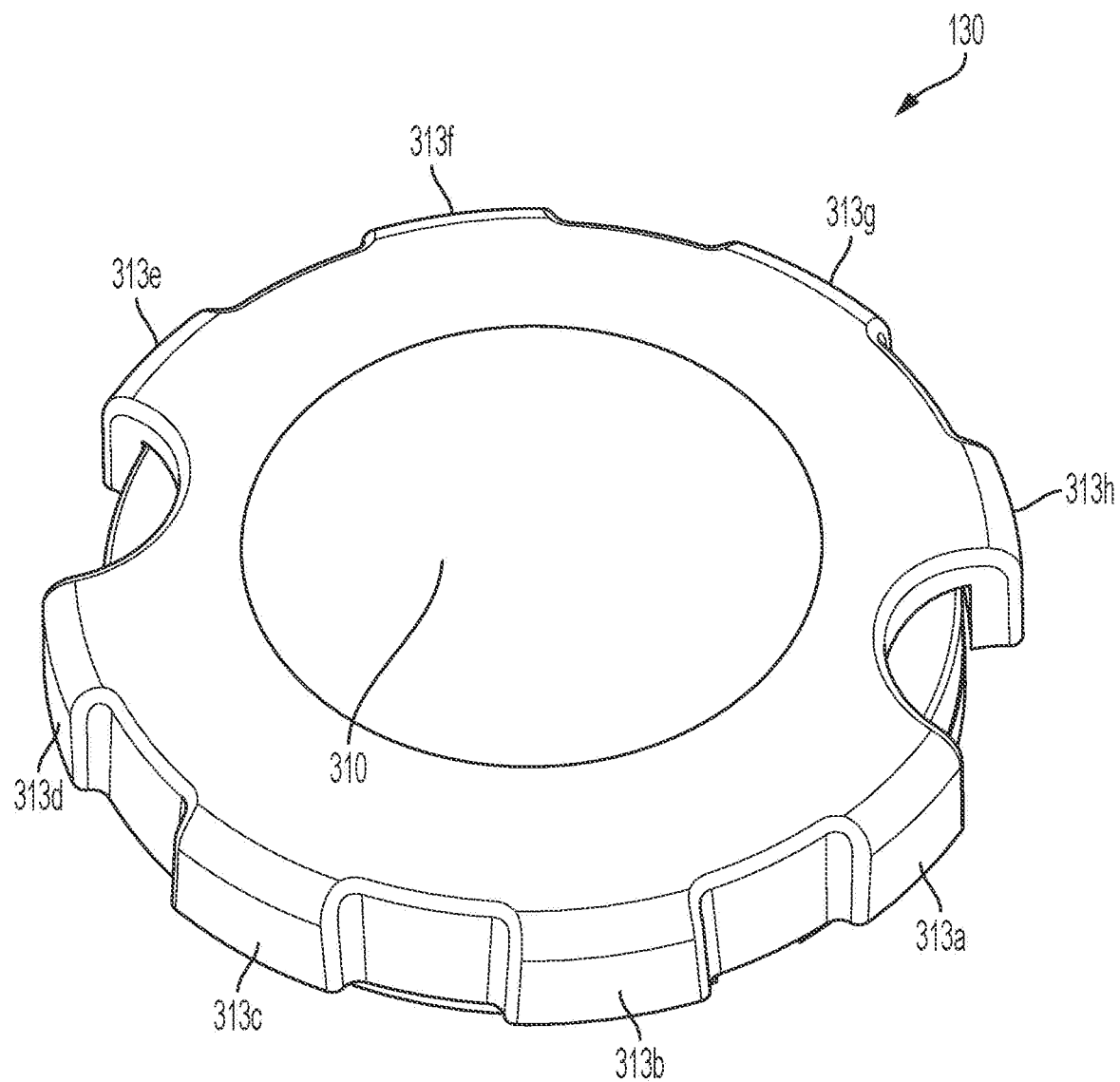
FIGS. 3A-3E show various views of a force amplified fastener assembly implementing an exemplary cycloid gear train according to embodiments of the present invention.
Figure 3B:
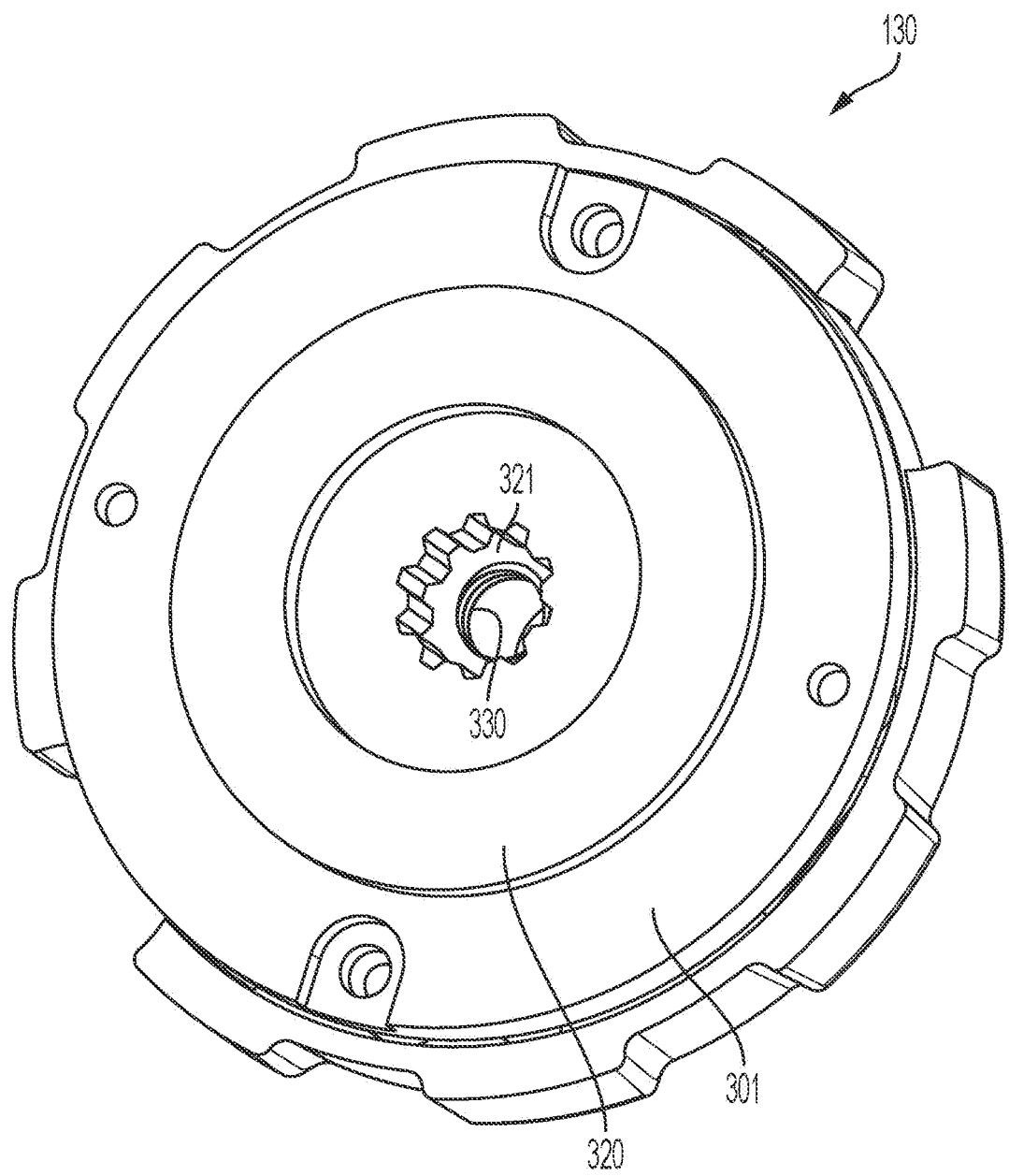

Having described an embodiment of force amplified fastener assembly 130 implementing a planetary gear train, reference is now made to the exemplary embodiment of FIGS. 3A-3E in which a cycloid gear configuration is implemented. FIGS. 3A and 3B show a cycloid gear configuration of an embodiment of force amplified fastener assembly 130 in its assembled state. As shown in the top isometric view of FIG. 3A, the illustrated cycloid gear configuration comprises top housing 310. Correspondingly, as shown in the bottom isometric view of FIG. 3B, the illustrated cycloid gear configuration comprises bottom structure 320. It should be appreciated that, although the views, housings, and structures are referred to as top and bottom, the designations are relative and there is no limitation that the example force amplified fastener assembly be disposed or utilized in any particular orientation with respect to top and bottom. For example, when utilized with respect to a lawn mower implementation of power tool 100, top housing 310 may be oriented as facing down when installed on shaft 111 and affixing detachable implement 120 in the form of a grass cutting blade to power tool 100.

Top housing 310 and bottom structure 320 are configured for cooperatively incarcerating a cycloid gear train and fastening element of the example force amplified fastener assembly. For example, as may be seen in the partially exploded views of FIGS. 3C-3E, bottom structure 320 may form a cupped structure sized and shaped to nest within a cupped casing formed by top housing 310. In accordance with some examples, the top edge circumference of bottom structure 320 may, when fully nested with top housing 310, terminate at or very near the bottom facing surface of top housing 310, such as for incarcerating components of the cycloid gear train and for providing a substantially enclosed area in which infiltration of debris and/or other matter is discouraged. The nested relationship of top housing 310 and bottom structure 320 of embodiments allows for relative rotational movement between the top and bottom structures (e.g., top housing 310 may be rotated while bottom structure 320 nested therein is held stationary).

As can be seen in FIGS. 3A-3E, the example cycloid gear configuration of force amplified fastener assembly 130 comprises bottom housing 301 configured to enclose components of the gear train and/or a lock mechanism used therewith within the cupped structure of top housing 310. Bottom housing 301 of the illustrated example comprises a substantially planar bottom housing that may be affixed by various fastening means (e.g., screws, adhesive, welding, locking tabs, etc.) to top housing 310 to enclose some or all of the area within the concavity of the top housing cupped structure. Bottom structure 320 may, for example, be incarcerated by bottom housing 301 whereby at least a portion of bottom structure 320 is disposed within the concavity of the top housing cupped structure. In accordance with embodiments of the invention, bottom structure 320 is free to rotate axially with respect to top housing 310 and bottom housing 301 affixed to top housing 310.

In the illustrated example, bottom structure 320 is sized so as to provide clearance with respect to components of an embodiment of a lock mechanism (described in detail below). The configuration of bottom housing 301 may provide a skirting flange and/or other structure to substantially enclose the gap between the bottom edge circumference of top housing 310 and the bottom edge circumference of bottom structure 320, such as to prevent infiltration of debris and/or other matter into the area of the lock mechanism and/or to facilitate retaining the top housing and bottom structure in the nested relationship.

Top housing 310 of embodiments may be configured to facilitate manual manipulation by a user. For example, top housing 310 may be sized and shaped to facilitate grasping by hand so that a user may manually apply torque forces (e.g., torque in fastening and/or releasing directions) to force amplified fastener assembly 130. Additionally or alternatively, top housing 310 may comprise surface features (e.g., rib structure, surface perturbations, rubberized over-molding, etc.) for facilitating gripping and application of force. The illustrated embodiment of top housing 310, for example, includes rib structures 313a-313h disposed about the circumference of the top housing, such as may be utilized to enable and/or enhance a user's grip upon force amplified fastener assembly 130.

Bottom structure 320 of the illustrated embodiment is configured to accept insertion of drive member of a power tool, such as shaft 111 of power tool 100, for facilitating interfacing the drive member with a fastening element of force amplified fastener assembly 130. For example, shaft orifice 321 of the illustrated embodiment of bottom structure 320 may be sized and shaped to accommodate insertion of an end of shaft 111 there through. According to some examples, shaft orifice 321 may be shaped or otherwise be configured (e.g., comprising the undulated circumference of the illustrated embodiment, a square circumference, a hexagonal circumference, etc.) for interfacing with one or more components external to force amplifying fastener assembly 130 (e.g., stay 121 of FIG. 1, as may be disposed upon shaft 111), such as for discouraging or preventing relative rotary movement (e.g., for avoiding unintended unfastening the fastening element as a result of inertial force when the power tool stops or is braked).

Figure 3C:
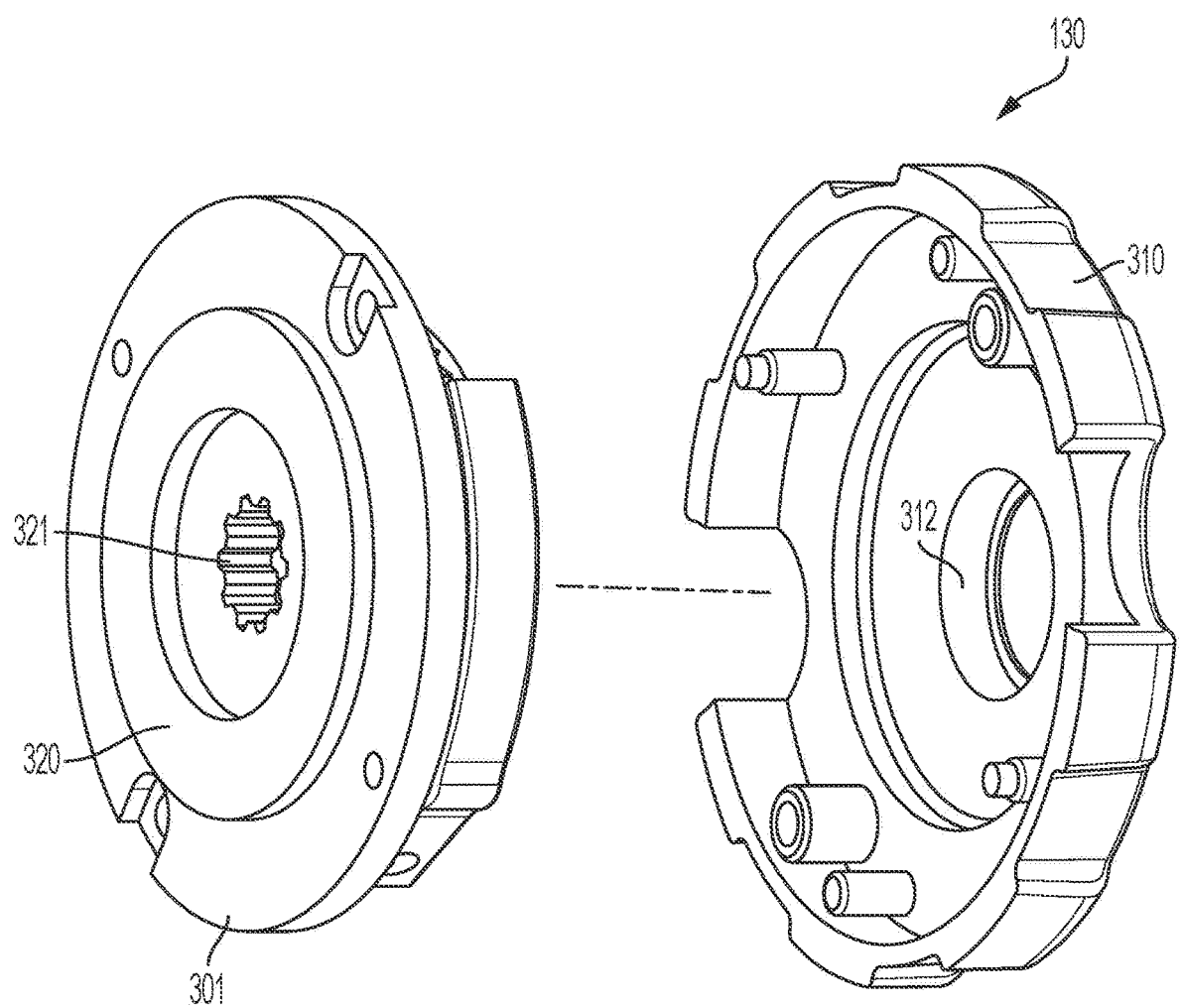
Figure 3D:
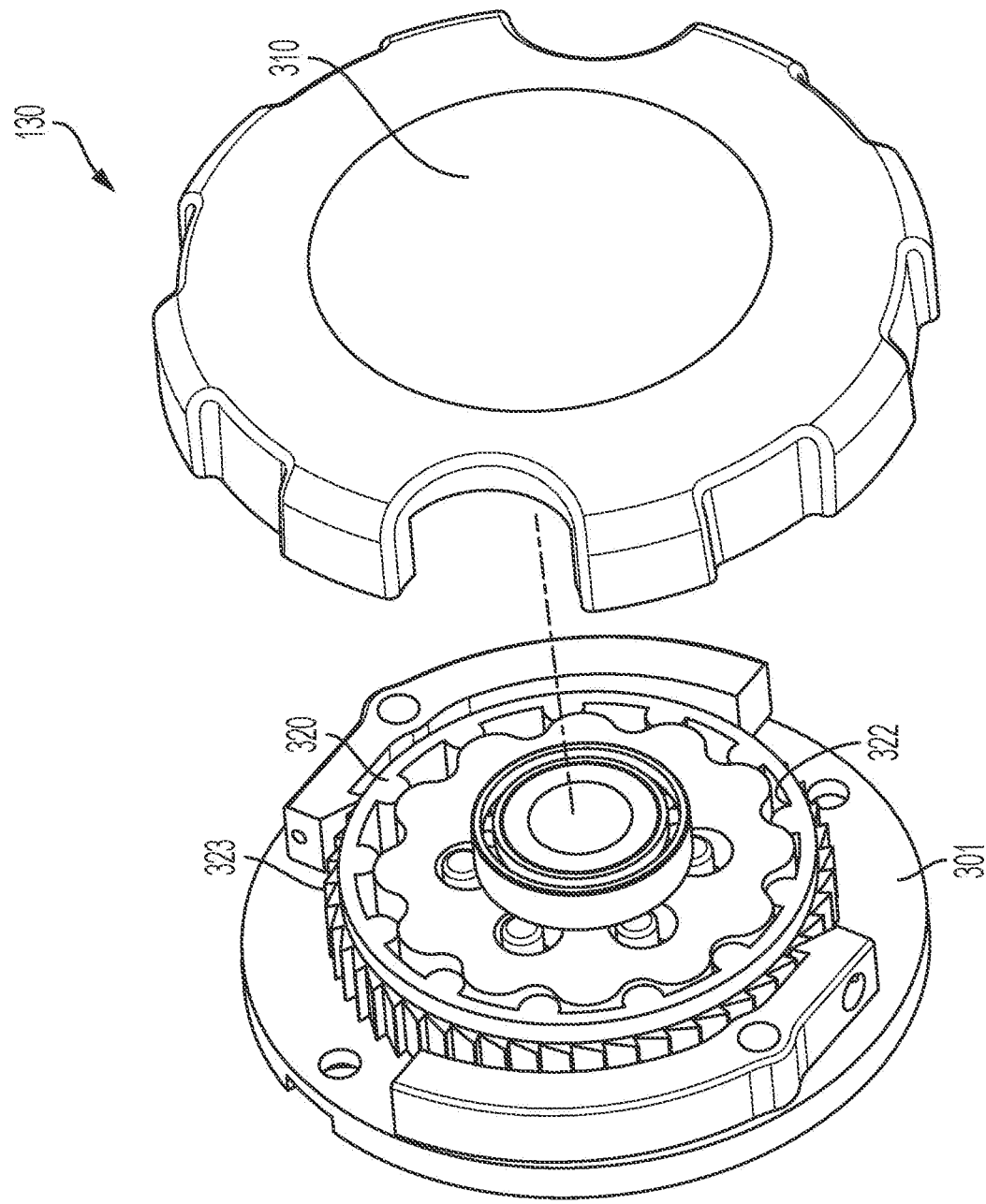
Figure 3E:
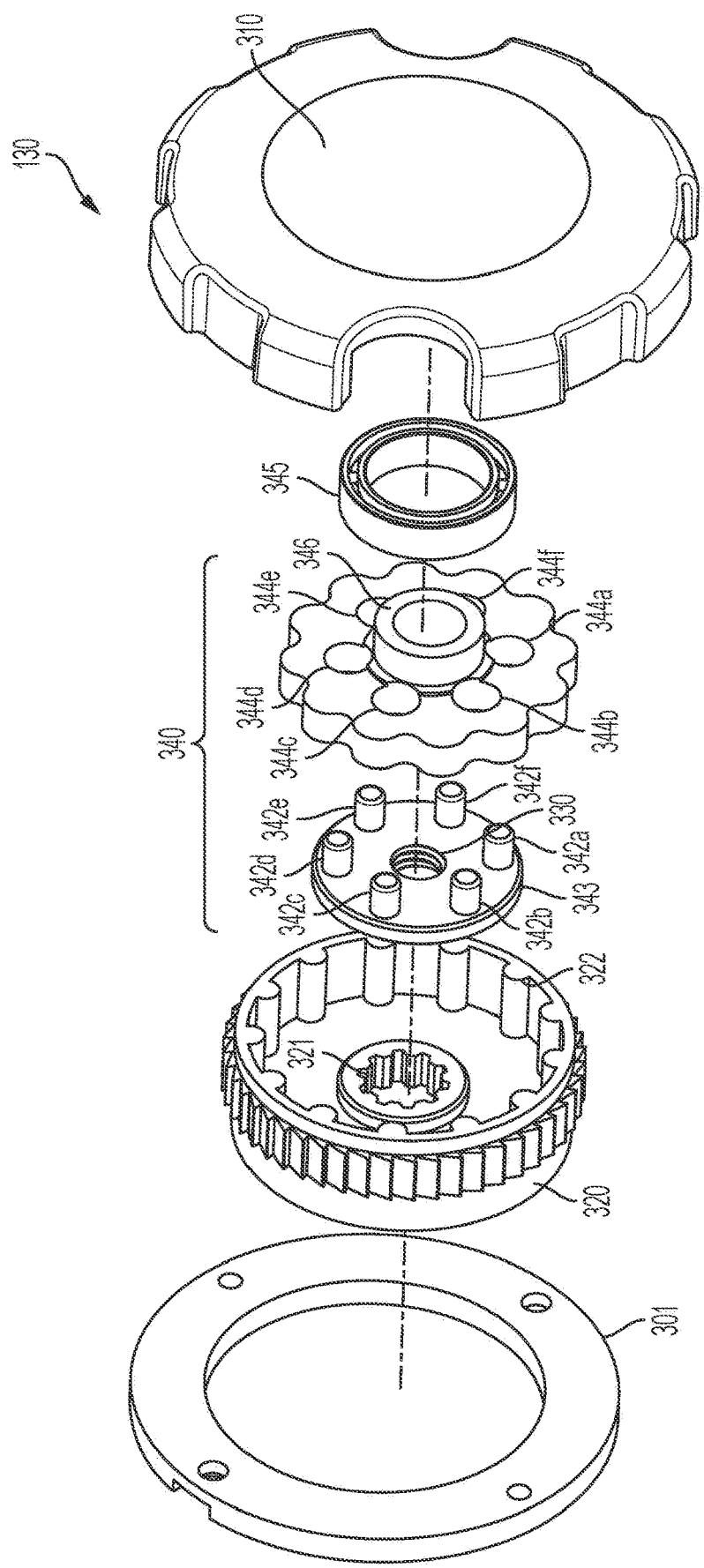

Force amplified fastener assembly 130 of the embodiment of FIGS. 3A-3E implements a cycloid gear train configured for giving a mechanical advantage with respect to applying tightening or loosening torque to fastening element 330 in response to manual manipulation (e.g., grasping by hand to manually apply torque in a fastening direction or releasing direction) of the fastener assembly. Accordingly, as shown in FIG. 3C, top housing 310 of the example embodiment includes eccentric receiver 312 configured for providing eccentric rotation of shaft 346 of the cycloid gear train in the illustrated cycloid gear configuration of force amplified fastener assembly 130. Eccentric receiver 312 of embodiments is disposed slightly off-center within the bottom facing surface of top housing 310, whereby as top housing 310 is rotated eccentric receiver 312 rotates about or orbits a central point of the bottom facing surface. As shown in FIG. 3D, bottom structure 320 includes ring gear 322 of the exemplary cycloid gear train. Cycloid gear assembly 340, visible in the further exploded view of FIG. 3E (having some components of the exemplary embodiment of force amplified fastener assembly 130 omitted), interfaces between eccentric receiver 312 and ring gear 322 to provide a cycloid gearing implementation. Cycloid gear assembly 340 of the illustrated embodiments comprises cycloidal disk 341 and roller pins 342a-342f disposed on pin plate 343, wherein roller pins 342a-342f are inserted in corresponding ones of orifices 344a-344f of cycloidal disk 341 when cycloid gear assembly 340 is assembled. Shaft 346 of cycloidal disk 341 interfaces with eccentric receiver 312 via bearing 345 of the illustrated embodiment. Cycloid gear assembly 340 of the illustrated embodiment is received within a cavity of the cupped structure formed by bottom structure 320, whereby once bottom structure 320 is fully nested with top housing 310 cycloid gear assembly 340 is incarcerated within an interior area of the top and bottom structures and provide an interface between eccentric receiver 312 and ring gear 322.

In accordance with embodiments, eccentric receiver 312 is formed as part of or otherwise affixed to top housing 310 and ring gear 322 is affixed to or formed as part of bottom structure 320. Accordingly, when top housing 310 is rotated (e.g., in response to a user manually applying a torque force thereto), eccentric receiver 312 of embodiments will correspondingly be rotated eccentrically (e.g., rotating about a center point of the bottom surface of top housing 310), correspondingly eccentrically rotating cycloid gear assembly 340 via shaft 346. Similarly, ring gear 322 rotates or does not rotate in correspondence with bottom structure 320. The incarcerated relationship of cycloid gear assembly 340 within the interior area of bottom structure 320 nested within top housing 310 allows for relative rotational movement of pin plate 343 with respect to the top housing and bottom structure. For example, top housing 310 may be rotated with bottom structure 320 nested therein held stationary and pin plate 343 may rotate at a different speed than top housing 310. That is, rotation of top housing 310 and thus eccentric receiver 312 interfaced with cycloidal disk 341 causes the cycloidal disk to rotate correspondingly in an eccentric motion, whereby cycloidal disk 341 meshed with the lobes of ring gear 322 held stationary by bottom structure 320 engages roller pins 342a-342f via orifices 344a-344f to transfer rotational force to pin plate 343, albeit at a reduced rotational rate and having a higher torque force.

Cycloid gear assembly 340 includes fastening element 330 disposed in coaxial correspondence with shaft orifice 321. For example, the illustrated embodiment of fastening element 330 comprises a portion of an orifice in pin plate 343 that is sized and shaped to correspond to the size and shape of an end of shaft 111 of power tool 100 and is appropriately threaded to engage the end of shaft 111, such as may be utilized to fix, mount, tighten, etc. detachable implement 120 onto shaft 111. Accordingly, fastening element 330 of the illustrated embodiment comprises a threaded fastening device formed integral to another component of force amplified fastener assembly 130 and is configured to be rotated in a fastening direction and a releasing direction upon a power member.

Although fastening element 330 of the example illustrated in FIGS. 3A-3E is described as being formed integral to pin plate 343, it should be appreciated that other configurations of fastening elements may be utilized according to embodiments of the invention. For example, rather than a portion of another component being configured to provide fastening element 330, some embodiments of fastening element 330 may comprise a separate component (e.g., nut). For example, a fastening element housing may be affixed to or formed as part of pin plate 343 and may have a shaft orifice sized and shaped to accommodate insertion of an end of shaft 111 there through, whereby a fastening element may be disposed within a receiver cavity of the fastening element housing.

In operation of force amplified fastener assembly 130 of the embodiment of FIGS. 3A-3E, when shaft 111 is inserted through orifice 321 and interfaces with fastener element 330, top housing 310 may be grasped by the hand of a user and rotated in a fastening direction or a releasing direction to correspondingly rotate fastener element 330 relative to shaft 111. Eccentric receiver 312, cycloidal disk 341, ring gear 322, and roller pins 342a-342f of the cycloid gear train provide a mechanical advantage with respect to applying tightening or loosening torque to fastening element 330. That is, a mechanical advantage corresponding to the relationship between the number of lobes on the cycloidal disk and the ring gear (e.g., on the order of 3-15 times) may be implemented between the torque manually applied to top housing 310 and the resultant torque applied to fastener element 330.

As can be appreciated from the foregoing, force amplified fastener assembly 130 is configured according to embodiments of the invention to provide appreciable mechanical advantage with respect to rotating a fastening element through implementation of a force amplifying gear train configuration. In accordance with aspects of the invention, a user may be enabled to manually apply tightening or loosening torque by hand sufficient to impart a friction interface between force amplified fastener assembly 130 and a corresponding detachable implement so as to prevent unwanted relative displacement of the detachable implement during use of the power tool, to overcome increased frictional interfacing resulting from inertial tightening of the amplified fastener assembly during use of the power tool, and/or to prevent unwanted loosening or separation of the force amplified fastener assembly during use of the power tool. For example, force amplified fastener assembly 130 of embodiments may facilitating tightening a fastening element thereof sufficiently by hand to retain a detachable implement upon a reversible power tool such that relative motion of the detachable implement is held to below 150 in either direction upon application of torque applied to the detachable implement by operation of the power tool.

Force amplified fastener assembly 130 of some embodiments of the invention may include a lock mechanism operative to lock and/or unlock the force amplified fastener assembly and thus a fastening element thereof. For example, a lock mechanism of embodiments may be used in addition to or in the alternative to the above mentioned friction interface between force amplified fastener assembly 130 and detachable implement 120 to prevent unwanted relative displacement of the detachable implement. Accordingly, in operation according to some examples, a lock mechanism may be utilized to lock force amplified fastener assembly 130 so that the fastening assembly is not released unwantedly or unintentionally. For example, a locking mechanism of embodiments of the invention may provide locking with respect to movement of a top housing relative to a bottom structure of a force amplified fastener assembly, whereby undesired rotation of a fastening element in a fastening direction and/or a releasing direction may be prevented. Such embodiments of a locking mechanism may thus act indirectly upon the fastening element for preventing unwanted rotation in one or more directions. Additionally or alternatively, a lock mechanism of embodiments of the invention may act directly upon a fastening element, such as by directly interfacing with one or more surfaces thereof to prevent unwanted rotation in one or more directions.

Figure 4A:
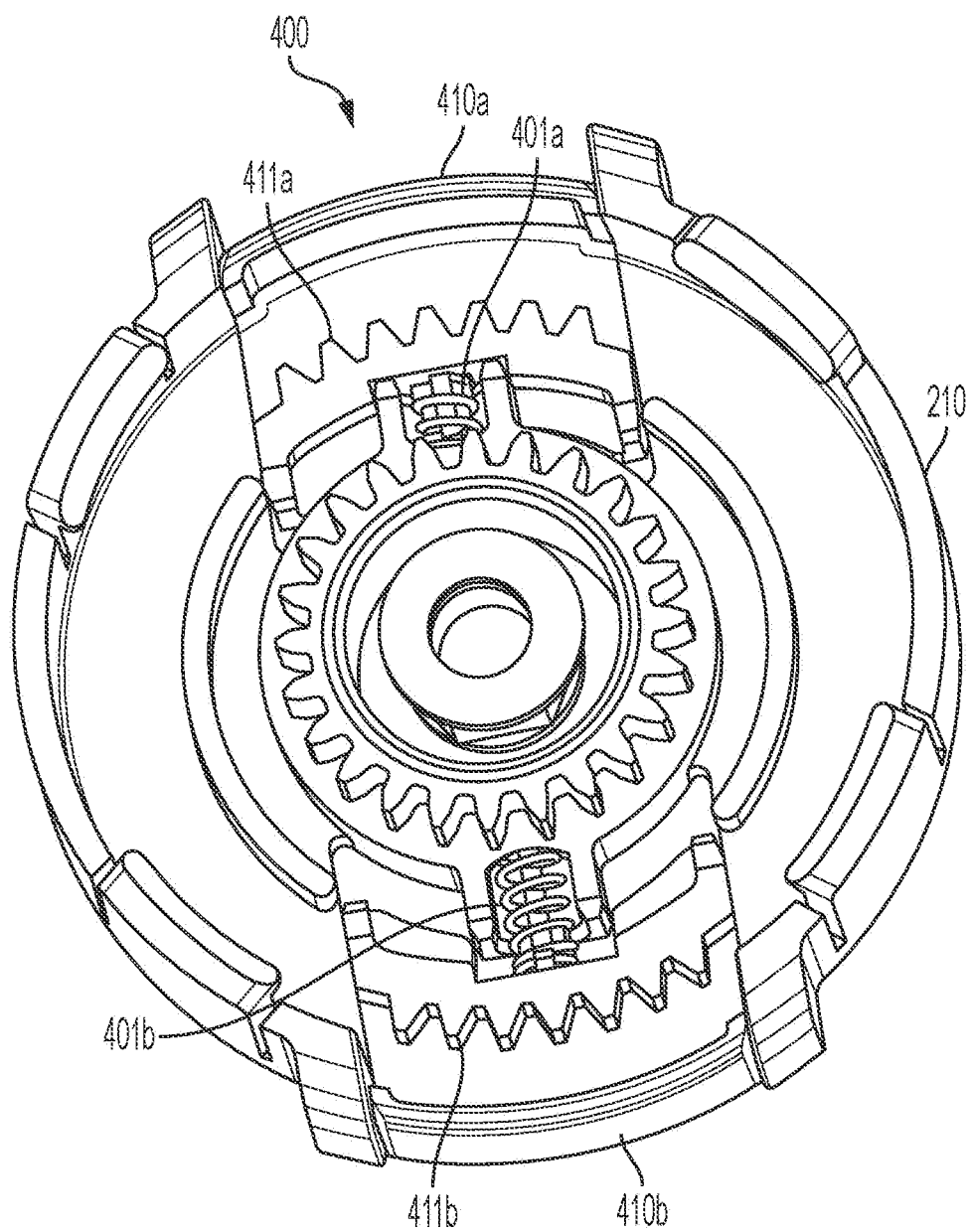
FIGS. 4A-7B show details of exemplary lock mechanisms for force amplified fastener assemblies according to embodiments of the present invention.
Figure 4B:
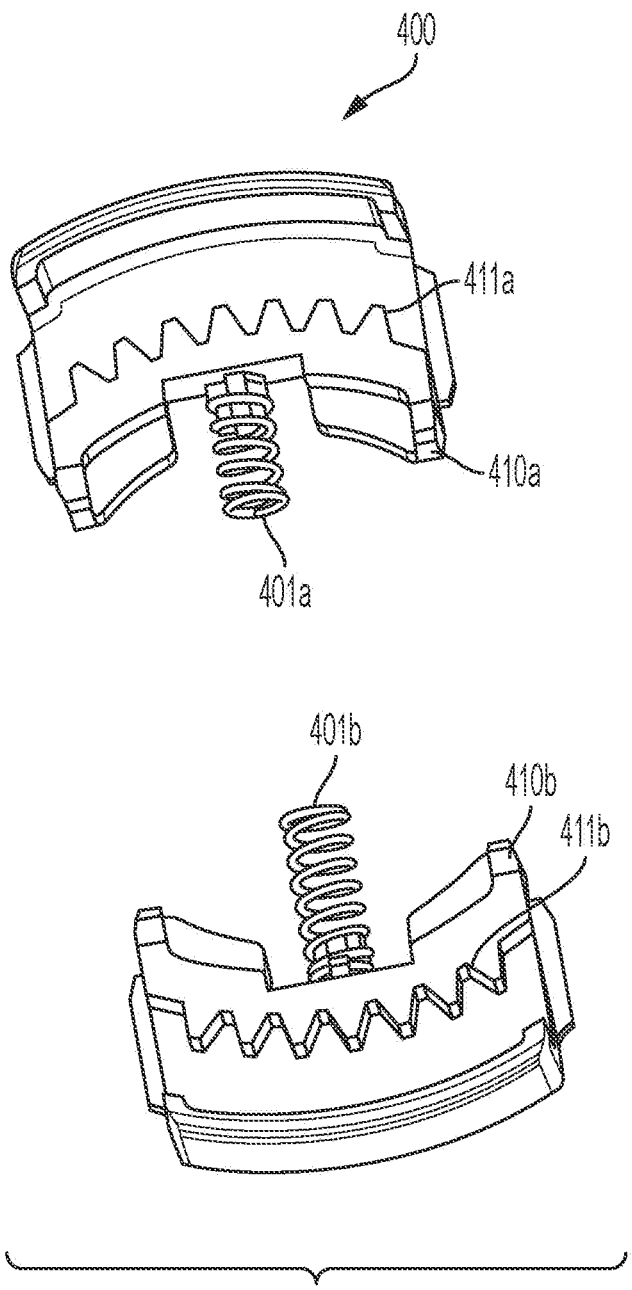

FIGS. 4A and 4B show details with respect to an exemplary lock mechanism implemented with respect to the planetary gear train configuration of the embodiment of FIGS. 2A-2E. Lock mechanism 400 of the example illustrated in FIGS. 4A and 4B includes lock elements 410a and 410b disposed in the underside of top housing 210. Lock elements 410a and 410b are configured for engaging bottom structure 220 (FIG. 2D) and provide locking with respect to movement of top housing 210 relative to bottom structure 220 of force amplified fastener assembly 130. For example, lock elements 410a and 410b of the illustrated embodiment include teeth 411a and 411b, respectively, configured for interfacing with the teeth of ring gear 222 (FIG. 2D) of bottom structure 220. Lock elements 410a and 410b may, for example, be slidably coupled to the underside surface of top housing 210, whereby when the lock elements are slid radially outward teeth 411a and 411b engage the teeth of ring gear 222 and prevent movement of top housing 210 relative to bottom structure 220. Further, lock elements 410a and 410b may be slid radially inward to a point that teeth 411a and 411b clear the teeth of ring gear 222 and movement of top housing 210 relative to bottom structure 220 is permitted.

Lock elements 410a and 410b of embodiments of lock mechanism 400 may utilize user action to unlock and/or lock the lock mechanism. Springs 401a and 401b may, for example, provide a bias force to hold lock elements 410a and 410b, respectively, in a radially outward position (e.g., lock mechanism 400 in a locked state). A user may apply a force (e.g., squeezing force) to a portion of lock elements 410a and 410b accessible via corresponding openings in top housing 210 to cause the lock elements to slide radially inward (e.g., lock mechanism 400 in an unlocked state) to disengage the lock mechanism. Alternatively, lock elements of lock mechanism 400 may be configured to move between locked and unlocked positions in response to one or more forces other than from user unlocking/locking action. For example, weighted pivot members may be provided with respect to lock elements 410a and 410b, whereby weights disposed at ends of the weighted pivot members may be acted on by centrifugal force to encourage lock elements 410a and 410b to move radially outward (e.g., placing lock mechanism 400 in a locked state) when power tool 100 is operating. Bias springs and/or gravity may be utilized to encourage the weighted pivot members to encourage lock elements 410a and 410b to move radially inward (e.g., placing lock mechanism 400 in an unlocked state) when power tool 100 is not operating or is disposed in a service orientation.

In operation according to the illustrated embodiment of lock mechanism 400, movement of top housing 210 relative to bottom structure 220 when lock mechanism 400 is in a locked state is prevented in both the fastening direction and the releasing direction. For example, teeth 411a and 411b are sized and shaped to correspond to the size and shape of the teeth of ring gear 222 to thereby provide a locking engagement (e.g., when lock elements 410a and 410b are in a radially outward position) which discourages rotation in either direction. Alternative embodiments may, however, provide different configurations of teeth 411a and 411b, such as to facilitate preventing movement of top housing 210 relative to bottom structure 220 in a first direction (e.g., releasing direction) when lock elements 410a and 410b are in a radially outward position while allowing movement of top housing 210 relative to bottom structure 220 in a second direction (e.g., fastening direction) when lock elements 410a and 410b are in a radially outward position. For example, teeth 411a and 411b may be provided in a saw-tooth type configuration, wherein a ramped side of the saw-teeth permits relative movement and a bulkhead side prevents relative movement such that movement of top housing 210 relative to bottom structure 220 is prevented in one direction (e.g., the releasing direction) but not the other (e.g., the fastening direction).

Figure 5A:
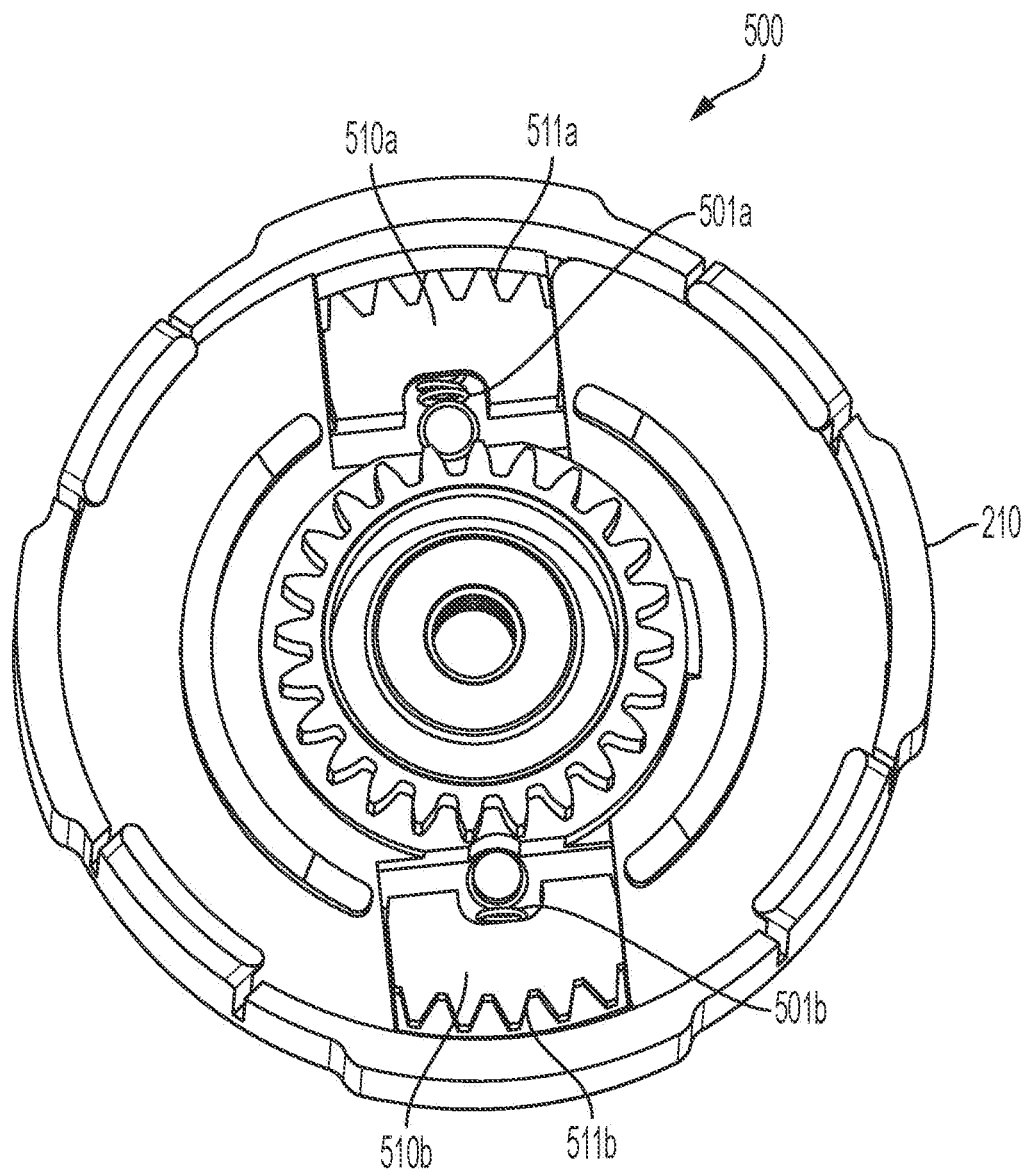
Figure 5B:
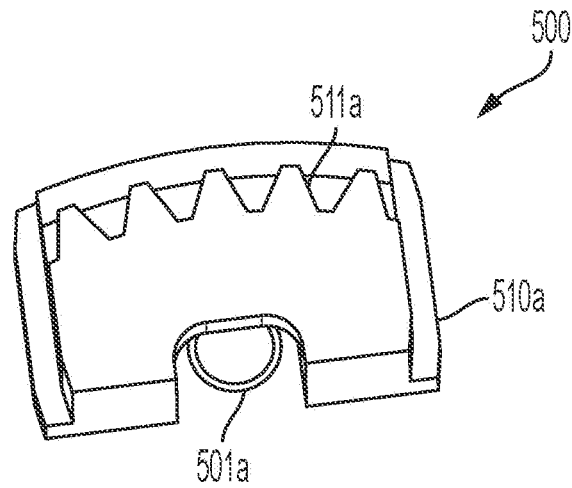
Figure 5B:
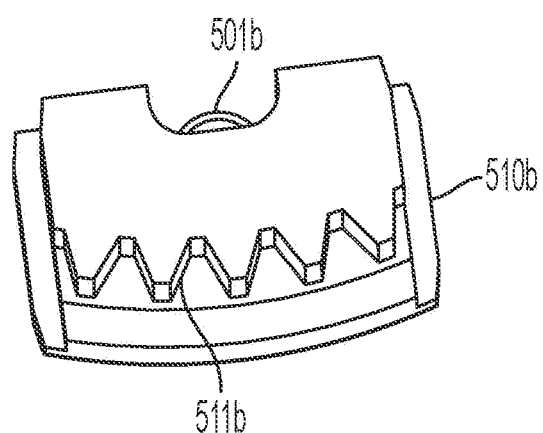

FIGS. 5A and 5B show details with respect to another exemplary lock mechanism as may be implemented with respect to the planetary gear train configuration of the embodiment of FIGS. 2A-2E. Lock mechanism 500 of the example illustrated in FIGS. 5A and 5B includes lock elements 510a and 510b disposed in the underside of top housing 210. Lock elements 510a and 510b are configured for engaging bottom structure 220 (FIG. 2D) and provide locking with respect to movement of top housing 210 relative to bottom structure 220 of force amplified fastener assembly 130. For example, lock elements 510a and 510b of the illustrated embodiment include teeth 511a and 511b, respectively, configured for interfacing with the teeth of ring gear 222 (FIG. 2D) of bottom structure 220. Lock elements 510a and 510b may, for example, be slidably coupled to the underside surface of top housing 210, whereby when the lock elements are slid radially outward teeth 511a and 511b engage the teeth of ring gear 222 and prevent movement of top housing 210 relative to bottom structure 220. Further, lock elements 510a and 510b may be slid radially inward to a point that teeth 511a and 511b clear the teeth of ring gear 222 and movement of top housing 210 relative to bottom structure 220 is permitted.

Lock elements 510a and 510b of embodiments of lock mechanism 500 may move between locked and unlocked positions in response to various forces, such as centrifugal force and/or the force of gravity. For example, lock mechanism 500 may be placed in a locked state to prevent rotation in the releasing direction while the detachable implement is spinning sufficiently rapidly to cause lock elements 510a and 510b to slide outward and cause teeth 511a and 511b to engage the teeth of ring gear 222. In accordance with the illustrated example, lock elements 510a and 510b are weighted sufficiently to cause the lock elements to overcome the tension bias of springs 501a and 501b slide such that teeth 511a and 511b move outward and engage the teeth of ring gear 222 in response to centrifugal force resulting from rotation of the detachable implement and corresponding force amplified fastener assembly at a sufficient speed. In accordance with this example, when power tool 100 is stopped, a springs 501a and 501b may provide bias forces to pull lock elements 510a and 510b such that they are slid sufficiently inward for teeth 511a and 511b to disengage the teeth of ring gear 222. Additionally or alternatively, lock mechanism 500 may be placed in an unlocked state by the force of gravity to allow rotation in the releasing direction when power tool 100 is disposed in a particular orientation (e.g., unlocked when a head of the power tool upon which a detachable implement is fastened is turned upside down for user service). According to some embodiments, lock mechanism 500 may additionally or alternatively utilize user action to unlock and/or lock the lock mechanism. Springs 501a and 501b may, for example, be disposed to provide a bias force to hold lock elements 510a and 510b, respectively, such that teeth 511a and 511b are disposed in a radially outward position (e.g., lock mechanism 500 in a locked state). A user may apply a force (e.g., squeezing force) to a portion of lock elements 510a and 510b (e.g., pressing the lock elements) made accessible via corresponding openings in top housing 310 to cause the lock elements to slide such that teeth 511a and 511b move radially inward (e.g., lock mechanism 500 in an unlocked state) to disengage the lock mechanism.

In operation according to the illustrated embodiment of lock mechanism 500, movement of top housing 210 relative to bottom structure 220 when lock mechanism 500 is in a locked state is prevented in both the fastening direction and the releasing direction. For example, teeth 511a and 511b are sized and shaped to correspond to the size and shape of the teeth of ring gear 222 to thereby provide a locking engagement (e.g., when lock elements 510a and 510b are in a radially outward position) which discourages rotation in either direction. Alternative embodiments may, however, provide different configurations of teeth 511a and 511b, such as to facilitate preventing movement of top housing 210 relative to bottom structure 220 in a first direction (e.g., releasing direction) when lock elements 510a and 510b are in a radially outward position while allowing movement of top housing 210 relative to bottom structure 220 in a second direction (e.g., fastening direction) when lock elements 510a and 510b are in a radially outward position. For example, teeth 511a and 511b may be provided in a saw-tooth type configuration, wherein a ramped side of the saw-teeth permits relative movement and a bulkhead side prevents relative movement such that movement of top housing 210 relative to bottom structure 220 is prevented in one direction (e.g., the releasing direction) but not the other (e.g., the fastening direction).

Figure 6A:
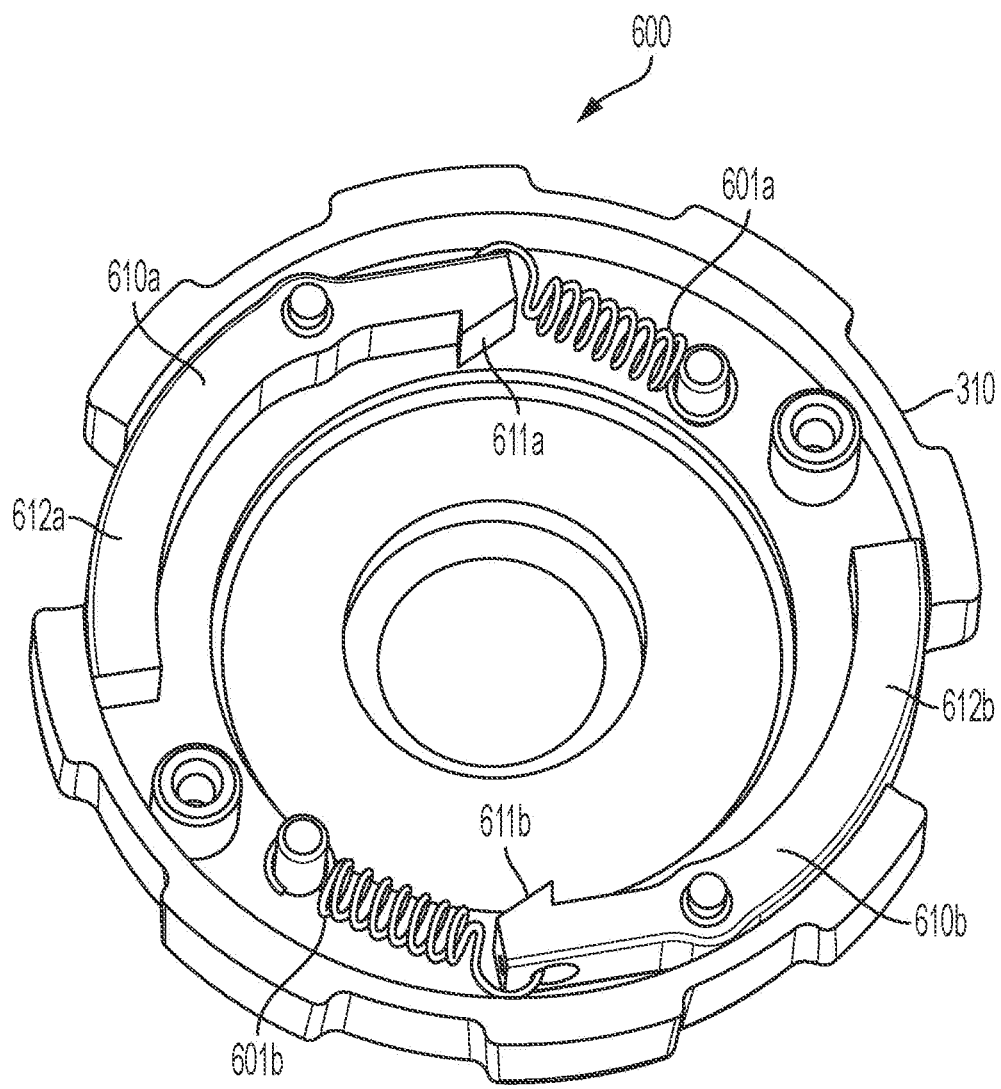
Figure 6B:
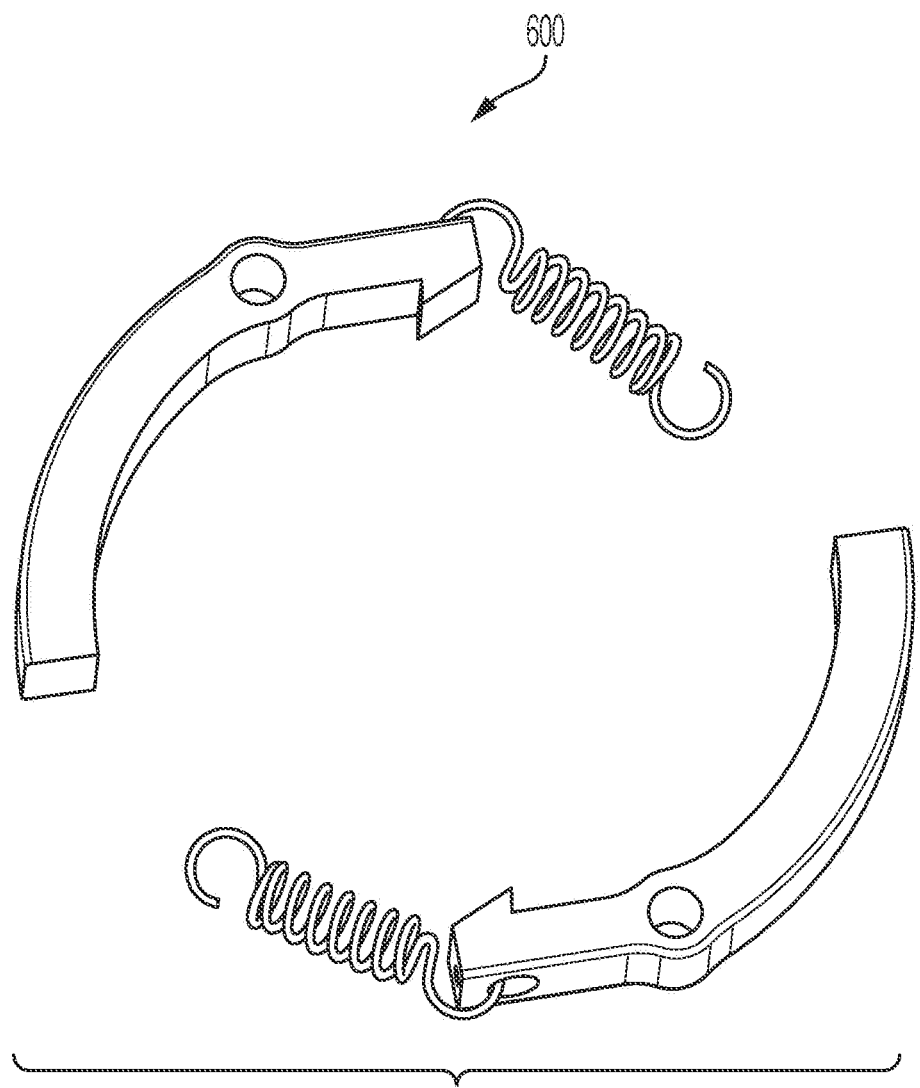

FIGS. 6A and 6B show details with respect to an exemplary lock mechanism implemented with respect to the cycloid gear train configuration of the embodiment of FIGS. 3A-3E. Lock mechanism 600 of the example illustrated in FIGS. 6A and 6B includes lock elements 610a and 610b disposed in the underside of top housing 310. Lock elements 610a and 610b are configured for engaging bottom structure 320 (FIG. 3D) and provide locking with respect to movement of top housing 310 relative to bottom structure 320 of force amplified fastener assembly 130. For example, lock elements 610a and 610b of the illustrated embodiment include teeth 611a and 611b, respectively, configured for interfacing with teeth 323 (FIG. 3D) disposed upon an outer circumference of ring gear 322 of bottom structure 220. Lock elements 610a and 610b may, for example, comprise pawls pivotally coupled to the underside surface of top housing 310, whereby when the lock elements are pivoted such that teeth 611a and 611b move radially inward such that the teeth engage teeth 323 of ring gear 322 and prevent movement of top housing 310 relative to bottom structure 320. Further, lock elements 610a and 610b may be pivoted radially outward to a point that teeth 611a and 611b clear teeth 323 of ring gear 322 and movement of top housing 310 relative to bottom structure 320 is permitted.

Lock elements 610a and 610b of embodiments of lock mechanism 600 may utilize user action to unlock and/or lock the lock mechanism. Springs 601a and 601b may, for example, provide a bias force to hold lock elements 610a and 610b, respectively, in a radially inward position (e.g., lock mechanism 600 in a locked state). A user may apply force (e.g., squeezing force) to arms 612a and 612b of lock elements 610a and 610b, respectively, accessible via corresponding openings in top housing 310 to cause the lock elements to pivot between locked and unlocked positions (e.g., lock mechanism in an unlocked state) to disengage the lock mechanism. Additionally or alternatively, lock elements of lock mechanism 600 may be configured to move between locked and/or unlocked positions in response to one or more forces other than from user unlocking/locking action. For example, arms 612a and 612b may be weighted, whereby the weighted pivot members may be acted on by centrifugal force to encourage lock elements 610a and 610b to pivot (e.g., placing lock mechanism 600 in a locked state) when power tool 100 is operating. Lock mechanism 600 of some embodiments may be placed in an unlocked state by the force of gravity to allow rotation in the releasing direction when power tool 100 is disposed in a particular orientation (e.g., unlocked when a head of the power tool upon which a detachable implement is fastened is turned upside down for user service).

In operation according to the illustrated embodiment of lock mechanism 600, movement of top housing 310 relative to bottom structure 320 when lock mechanism 600 is in a locked state is prevented in the releasing direction while movement in the fastening direction is permitted. For example, teeth 611a and 611b and teeth 323 of the illustrated embodiment are provided in saw-tooth type configurations, wherein a ramped side of the saw-teeth permits relative movement and a bulkhead side prevents relative movement such that movement of top housing 310 relative to bottom structure 320 is prevented in one direction (e.g., the releasing direction) but not the other (e.g., the fastening direction). Alternative embodiments of lock mechanism 600 may be configured to prevent movement of top housing 310 relative to bottom structure 320 in both the fastening direction and releasing direction when lock mechanism 600 is in a locked state. For example, teeth 611a and 611b and teeth 323 may be correspondingly sized and shaped to provide a locking engagement (e.g., when lock elements 610a and 610b are pivoted such that teeth 611a and 611b engage teeth 323) which discourages rotation in either direction.

Figure 7A:
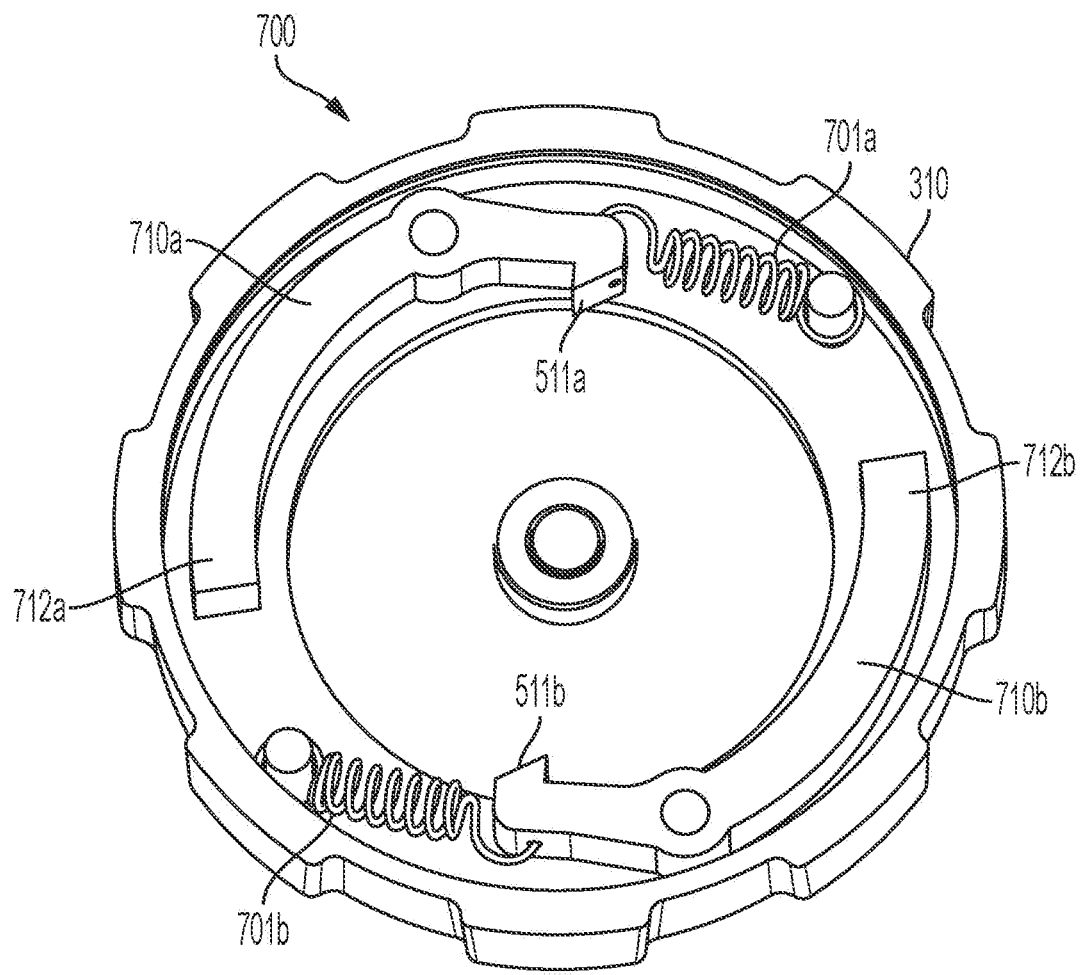
Figure 7B:
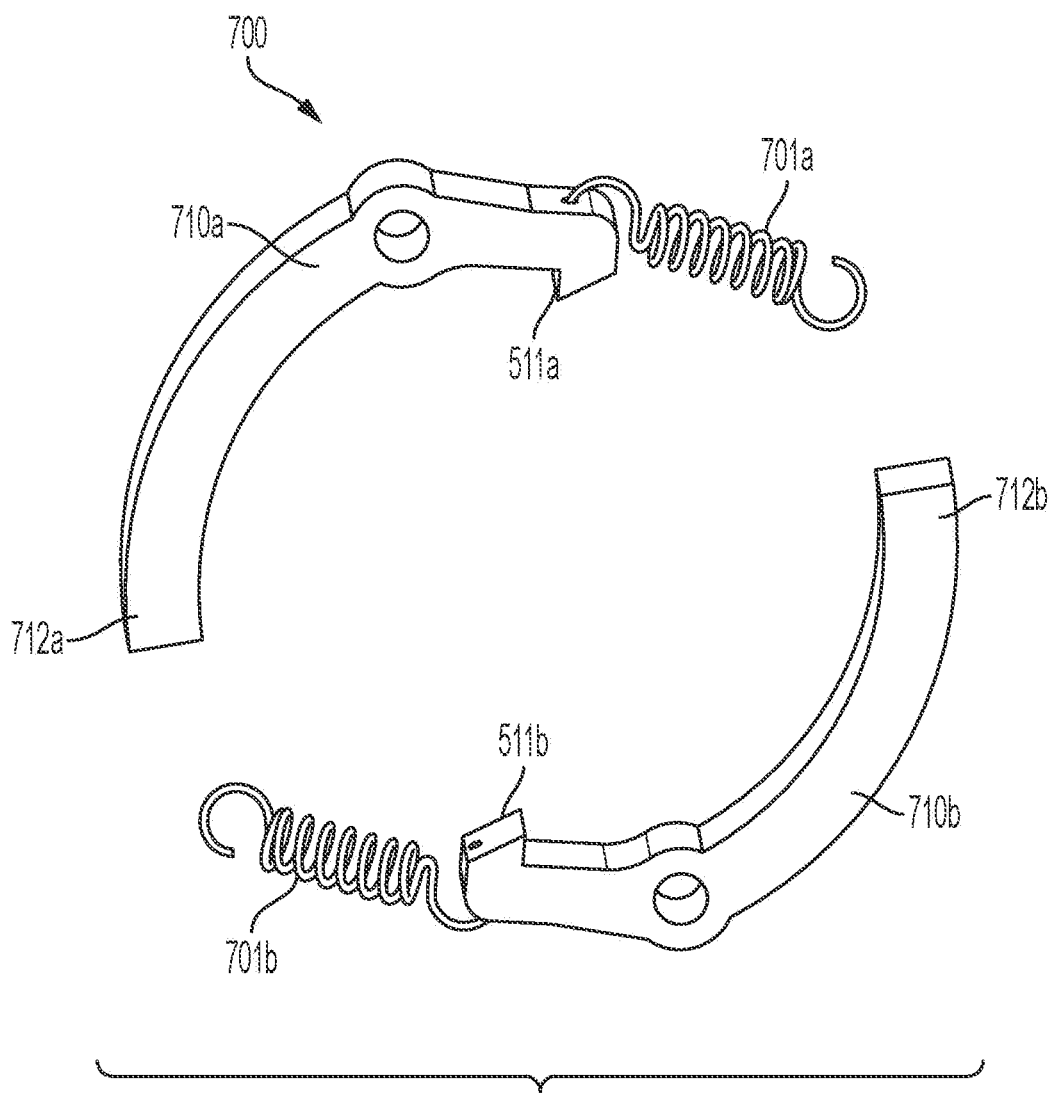

FIGS. 7A and 7B show details with respect to another exemplary lock mechanism as may be implemented with respect to the cycloid gear train configuration of the embodiment of FIGS. 3A-3E. Lock mechanism 700 of the example illustrated in FIGS. 7A and 7B includes lock elements 710a and 710b disposed in the underside of top housing 310. Lock elements 710a and 710b are configured for engaging bottom structure 320 (FIG. 3D) and provide locking with respect to movement of top housing 310 relative to bottom structure 320 of force amplified fastener assembly 130. For example, lock elements 710a and 710b of the illustrated embodiment include teeth 711a and 711b, respectively, configured for interfacing with teeth 323 (FIG. 3D) disposed upon an outer circumference of ring gear 322 of bottom structure 220. Lock elements 710a and 710b may, for example, comprise pawls pivotally coupled to the underside surface of top housing 310, whereby when the lock elements are pivoted such that teeth 711a and 711b move radially inward such that the teeth engage teeth 323 of ring gear 322 and prevent movement of top housing 310 relative to bottom structure 320. Further, lock elements 710a and 710b may be pivoted radially outward to a point that teeth 711a and 711b clear teeth 323 of ring gear 322 and movement of top housing 310 relative to bottom structure 320 is permitted.

Lock elements 710a and 710b of embodiments of lock mechanism 700 may pivoted between locked and unlocked positions in response to various forces, such as centrifugal force and/or the force of gravity. For example, lock mechanism 700 may be placed in a locked state to prevent rotation in the releasing direction while the detachable implement is spinning sufficiently rapidly to cause lock elements 710a and 710b to pivot and cause teeth 711a and 711b to engage teeth 323. In accordance with the illustrated example, weighted arms 712a and 712b of lock elements 710a and 710b, respectively, may cause the lock elements to pivot such that teeth 711a and 711b move inward and engage teeth 323 in response to centrifugal force resulting from rotation of the detachable implement and corresponding force amplified fastener assembly at a sufficient speed. In accordance with this example, when power tool 100 is stopped, springs 701a and 701b may provide bias forces to pull lock elements 710a and 710b such that they are pivoted sufficiently for teeth 711a and 711b to disengage teeth 323. Additionally or alternatively, lock mechanism 700 may be placed in an unlocked state by the force of gravity to allow rotation in the releasing direction when power tool 100 is disposed in a particular orientation (e.g., unlocked when a head of the power tool upon which a detachable implement is fastened is turned upside down for user service). According to some embodiments, lock mechanism 700 may additionally or alternatively utilize user action to unlock and/or lock the lock mechanism. Springs 701a and 701b may, for example, be disposed to provide a bias force to hold lock elements 710a and 710b, respectively, such that teeth 711a and 711b are disposed in a radially inward position (e.g., lock mechanism 700 in a locked state). A user may apply a force (e.g., squeezing force) to a portion of lock elements 710a and 710b (e.g., pressing weighted arms 712a and 712b) made accessible via corresponding openings in top housing 310 to cause the lock elements to pivot such that teeth 711a and 711b move radially outward (e.g., lock mechanism 700 in an unlocked state) to disengage the lock mechanism.

In operation according to the illustrated embodiment of lock mechanism 700, movement of top housing 310 relative to bottom structure 320 when lock mechanism 700 is in a locked state is prevented in the releasing direction while movement in the fastening direction is permitted. For example, teeth 711a and 711b and teeth 323 of the illustrated embodiment are provided in saw-tooth type configurations, wherein a ramped side of the saw-teeth permits relative movement and a bulkhead side prevents relative movement such that movement of top housing 310 relative to bottom structure 320 is prevented in one direction (e.g., the releasing direction) but not the other (e.g., the fastening direction). Alternative embodiments of lock mechanism 700 may be configured to prevent movement of top housing 310 relative to bottom structure 320 in both the fastening direction and releasing direction when lock mechanism 700 is in a locked state. For example, teeth 711a and 711b and teeth 323 may be correspondingly sized and shaped to provide a locking engagement (e.g., when lock elements 710a and 710b are pivoted such that teeth 711a and 711b engage teeth 323) which discourages rotation in either direction.

It should be appreciated that the foregoing lock mechanisms are substantially protected by structure of force amplified fastener assembly 130. For example, lock mechanisms 400, 500, 600, and 700 of the illustrated embodiments are disposed within an area of the cupped casing formed by the top housing. Moreover, embodiments of the lock mechanisms may be fully encased by the top housing and bottom structure (e.g., as provided by top housing 210 and bottom structure 220 with respect to the example of lock mechanisms 500 and as provided by top housing 310, bottom structure 320, and bottom housing 301 with respect to the example of lock mechanism 700), thereby providing added protection of the lock mechanisms. Accordingly, the latch mechanisms of embodiments of the invention may be protected from damage and unintentional release, such as may otherwise result in damage causing unintentional release of the latch mechanism and allowing the fastening device to become detached from the lawn mower.

Force amplified fastener assemblies of embodiments of the invention are configured to provide mechanical advantage with respect to rotating a fastening element, whereby a user may be enabled to manually apply tightening or loosening torque by hand for tool-free changing of a detachable implement. Configurations of force amplified fastener assemblies herein may be utilized in place of a conventional lock nut for affixing detachable implements to power tools, even retrofitting a conventional lock nut in some cases. Accordingly, backwardly compatible detachable implement configurations may be accommodated with a force amplified fastener assembly of embodiments of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A force amplified fastener assembly for removably coupling a detachable implement to a power tool, the force amplified fastener assembly comprising:
   a top housing forming a cupped casing;
   a bottom structure nested within an area of the cupped casing;
   a fastening element disposed between the top housing and the bottom structure and within the area of the cupped casing, wherein the fastening element is configured for engagement with a shaft of the power tool;
   a force amplifying gear train disposed in the area of the cupped casing and in mechanical communication with the top housing, the bottom structure, and the fastening element, wherein the force amplifying gear train provides a mechanical advantage with respect to application of torque to the fastening element in response to torque applied to the top housing; and
   a lock mechanism disposed within the area of the cupped casing of the top housing and operative to prevent rotation of the fastening element relative to the shaft in at least one rotational direction.

2. The force amplified fastener assembly of claim 1, wherein the top housing, bottom structure, force amplifying gear train, and the fastening element cooperate to facilitate installation and removal of the detachable implement on the shaft of the power tool in response to manual manipulation of the top housing without aid of additional tools.

3. The force amplified fastener assembly of claim 1, wherein force amplified torque applied to the fastening element by the force amplifying gear train is in a same direction as the torque applied to the top housing.

4. The force amplified fastener assembly of claim 1, wherein the bottom structure forms a cupped structure, and wherein the fastening element and the force amplifying gear train are disposed within an area incarcerated by the cupped casing of the top housing and the cupped structure of the bottom structure.

5. The force amplified fastener assembly of claim 4, wherein the force amplifying gear train comprises:
   a planetary gear configuration, wherein the cupped structure of the bottom structure provides a ring gear of the planetary gear configuration and a sun gear of the planetary gear configuration is attached to the top housing within the cupped casing.

6. The force amplified fastener assembly of claim 5, wherein the planetary gear configuration comprises:
   a gear plate attached to a plurality of planet gears that are meshed with the sun gear and the ring gear, wherein the fastening element rotates in direct correspondence to rotation of the gear plate.

7. The force amplified fastener assembly of claim 4, wherein the force amplifying gear train comprises:
   a cycloid gear configuration, wherein the cupped structure of the bottom structure provides a ring gear of the cycloid gear configuration and an eccentric shaft of the cycloid gear configuration is attached to the top housing within the cupped casing.

8. The force amplified fastener assembly of claim 7, wherein the cycloid gear configuration comprises:
   a cycloidal gear in mechanical communication with the eccentric shaft and the ring gear; and
   a pin plate in mechanical communication with the cycloidal gear via a plurality of roller pins of the pin plate, wherein the fastening element rotates in direct correspondence to rotation of the pin plate.

9. The force amplified fastener assembly of claim 1, wherein the lock mechanism is operative to prevent rotation of the fastening element relative to the shaft in two rotational directions.

10. The force amplified fastener assembly of claim 1, wherein the lock mechanism is engaged to prevent the rotation of the fastening element relative to the shaft by centrifugal force.

11. The force amplified fastener assembly of claim 1, wherein the lock mechanism is disengaged from preventing the rotation of the fastening element relative to the shaft without a user directly interacting with the lock mechanism.

12. A method for removably coupling a detachable implement to a power tool, the method comprising:
   interfacing a force amplified fastener assembly with a shaft of the power tool, wherein the force amplified fastener assembly includes a top housing forming a cupped casing, a bottom structure nested within an area of the cupped casing, a fastening element disposed between the top housing and the bottom structure and within the area of the cupped casing, and a force amplifying gear train disposed in the area of the cupped casing and in mechanical communication with the top housing, the bottom structure, and the fastening element, wherein the interfacing the force amplified fastener assembly with the shaft of the power tool engages the fastening element with the shaft; and
   applying torque to the top housing and inducing torque at the fastening element in a same direction as the torque applied to the top housing, wherein the force amplifying gear train provides a mechanical advantage with respect to the torque induced at the fastening element; and
   preventing rotation of the fastening element relative to the shaft in at least one rotational direction through operation of a lock mechanism disposed within the area of the cupped casing of the top housing.

13. The method of claim 12, wherein the applying torque to the top housing is a result of manual manipulation of the top housing and the mechanical advantage results in the torque induced at the fastening element sufficient to affix the detachable implement to the power tool for use of the power tool without aid of additional tools.

14. The method of claim 12, wherein the bottom structure forms a cupped structure, and wherein the fastening element and the force amplifying gear train are disposed within an area incarcerated by the cupped casing of the top housing and the cupped structure of the bottom structure.

15. The method of claim 14, wherein the force amplifying gear train is provided in a planetary gear configuration, wherein the cupped structure of the bottom structure provides a ring gear of the planetary gear configuration, and wherein a sun gear of the planetary gear configuration is attached to the top housing within the cupped casing.

16. The method of claim 15, wherein the planetary gear configuration includes a gear plate attached to a plurality of planet gears that are meshed with the sun gear and the ring gear, wherein the fastening element rotates in direct correspondence to rotation of the gear plate.

17. The method of claim 14, wherein the force amplifying gear train is provided in a cycloid gear configuration, wherein the cupped structure of the bottom structure provides a ring gear of the cycloid gear configuration, and wherein an eccentric shaft of the cycloid gear configuration is attached to the top housing within the cupped casing.

18. The method of claim 17, wherein the cycloid gear configuration includes a cycloidal gear in mechanical communication with the eccentric shaft and the ring gear, wherein the cycloid gear configuration also includes a pin plate in mechanical communication with the cycloidal gear via a plurality of roller pins of the pin plate, and wherein the fastening element rotates in direct correspondence to rotation of the pin plate.

19. The method of claim 12, wherein the lock mechanism is operative to prevent rotation of the fastening element relative to the shaft in two rotational directions.

20. The method of claim 12, wherein the lock mechanism is engaged to prevent the rotation of the fastening element relative to the shaft by centrifugal force.

21. The method of claim 12, wherein the lock mechanism is disengaged from preventing the rotation of the fastening element relative to the shaft without a user directly interacting with the lock mechanism.

22. A system for removably coupling a detachable implement to a power tool, the system comprising:
   force amplified fastener assembly including a top housing, a bottom structure, and a force amplifying gear train in mechanical communication with the top housing and bottom structure, wherein the force amplifying gear train is configured to provide a mechanical advantage with respect to torque induced at a fastening element responsive to torque applied to the top housing; and
   a stay disposed on a shaft or the detachable implement and configured to interface with the bottom structure preventing rotation of the bottom structure relative to the top housing when the torque is applied to the top housing.

23. The system of claim 22, wherein the top housing forms a cupped casing and the bottom structure is nested within an area of the cupped casing, wherein the fastening element is disposed between the top housing and the bottom structure and within the area of the cupped casing, and wherein the force amplifying gear train is disposed in the area of the cupped casing.

24. The system of claim 23, further comprising:
   a lock mechanism disposed within the area of the cupped casing of the top housing and operative to prevent rotation of the fastening element relative to the shaft in at least one rotational direction.

* * * * *